US009865265B2

(12) United States Patent
Ramprashad et al.

(10) Patent No.: US 9,865,265 B2
(45) Date of Patent: *Jan. 9, 2018

(54) MULTI-MICROPHONE SPEECH RECOGNITION SYSTEMS AND RELATED TECHNIQUES

(71) Applicant: Apple Inc., Cupertino, CA (US)

(72) Inventors: Sean A. Ramprashad, Los Altos, CA (US); Harvey D. Thornburg, Sunnyvale, CA (US); Arvindh Krishnaswamy, Palo Alto, CA (US); Aram M. Lindahl, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/732,715

(22) Filed: Jun. 6, 2015

(65) Prior Publication Data

US 2016/0358619 A1   Dec. 8, 2016

(51) Int. Cl.
*G10L 21/00* (2013.01)
*G10L 15/34* (2013.01)
(Continued)

(52) U.S. Cl.
CPC .............. *G10L 15/34* (2013.01); *G10L 15/20* (2013.01); *G10L 15/16* (2013.01); *G10L 2015/022* (2013.01); *G10L 2021/02166* (2013.01)

(58) Field of Classification Search
None
See application file for complete search history.

(56) References Cited

U.S. PATENT DOCUMENTS

| 5,539,859 A | 7/1996 | Robbe et al. |
| 5,828,997 A | 10/1998 | Durlach et al. |

(Continued)

FOREIGN PATENT DOCUMENTS

| EP | 0472356 A1 | 2/1992 |
| EP | 1901282 A2 | 3/2008 |

OTHER PUBLICATIONS

M. Delcroix, et al. Linear prediction-based dereverberation with advanced speech enhancement and recognition technologies for the reverb challenge. Proceedings of REVERB workshop 2014, pp. 1-8, Florence, Italy, 2014.

(Continued)

*Primary Examiner* — Satwant Singh
(74) *Attorney, Agent, or Firm* — Ganz Pollard, LLC

(57) ABSTRACT

A speech recognition system for resolving impaired utterances can have a speech recognition engine configured to receive a plurality of representations of an utterance and concurrently to determine a plurality of highest-likelihood transcription candidates corresponding to each respective representation of the utterance. The recognition system can also have a selector configured to determine a most-likely accurate transcription from among the transcription candidates. As but one example, the plurality of representations of the utterance can be acquired by a microphone array, and beamforming techniques can generate independent streams of the utterance across various look directions using output from the microphone array.

19 Claims, 17 Drawing Sheets

(51) Int. Cl.
*G10L 15/20* (2006.01)
*G10L 15/16* (2006.01)
*G10L 15/02* (2006.01)
*G10L 21/0216* (2013.01)

(56) References Cited

U.S. PATENT DOCUMENTS

| | | | |
|---|---|---|---|
| 6,937,980 B2 | 8/2005 | Krasny et al. | |
| 7,567,678 B2 | 7/2009 | Kong et al. | |
| 7,660,713 B2* | 2/2010 | Surendran | G06K 9/00536 704/226 |
| 7,729,904 B2* | 6/2010 | Bennett | G06F 17/27 704/215 |
| 8,160,986 B2* | 4/2012 | Lamprecht | G06N 7/005 706/20 |
| 8,194,872 B2 | 6/2012 | Buck et al. | |
| 8,392,185 B2 | 3/2013 | Nakadai et al. | |
| 8,565,446 B1 | 10/2013 | Ebenezer et al. | |
| 8,589,152 B2* | 11/2013 | Emori | G10L 25/78 704/208 |
| 8,731,929 B2 | 5/2014 | Kennewick et al. | |
| 8,793,124 B2* | 7/2014 | Hidaka | G10L 25/00 704/208 |
| 8,868,428 B2 | 10/2014 | Gruenstein et al. | |
| 8,923,529 B2 | 12/2014 | McCowan | |
| 8,977,248 B1* | 3/2015 | Bladon | G10L 15/26 370/300 |
| 9,129,591 B2 | 9/2015 | Sung et al. | |
| 9,275,635 B1 | 3/2016 | Beaufays et al. | |
| 9,286,897 B2* | 3/2016 | Bisani | G10L 15/08 |
| 9,589,564 B2 | 3/2017 | Sharifi | |
| 9,646,606 B2* | 5/2017 | Peng | G10L 15/08 |
| 2003/0055634 A1* | 3/2003 | Hidaka | G10L 25/00 704/222 |
| 2006/0004570 A1 | 1/2006 | Ju et al. | |
| 2006/0245601 A1 | 11/2006 | Michaud et al. | |
| 2009/0037171 A1* | 2/2009 | McFarland | G10L 15/26 704/235 |
| 2012/0185247 A1 | 7/2012 | Tzirkel-Hancock et al. | |
| 2013/0346078 A1 | 12/2013 | Gruenstein et al. | |
| 2014/0343935 A1 | 11/2014 | Jung et al. | |
| 2015/0012271 A1 | 1/2015 | Peng et al. | |
| 2015/0071455 A1 | 3/2015 | Tzirkel-Hancock et al. | |
| 2015/0095026 A1* | 4/2015 | Bisani | G10L 15/08 704/232 |
| 2015/0221305 A1 | 8/2015 | Sharifi | |
| 2015/0279360 A1 | 10/2015 | Mengibar et al. | |
| 2016/0019026 A1* | 1/2016 | Gupta | G06F 3/167 704/233 |
| 2016/0086599 A1 | 3/2016 | Kurata et al. | |
| 2016/0275943 A1 | 9/2016 | Hakkani-Tur et al. | |
| 2016/0358606 A1* | 12/2016 | Ramprashad | G10L 15/32 |
| 2016/0358619 A1 | 12/2016 | Ramprashad et al. | |
| 2017/0103754 A1* | 4/2017 | Higbie | G10L 15/22 |

OTHER PUBLICATIONS

J. Li, et al. On robust capon beamforming and diagonal loading. IEEE Transactions on Signal Processing, 51:257-286, 2003.

M. Mimura, et al. Exploring deep neural networks and deep autoencoders in reverberant speech recognition. Proceedings of 2014 4th Joint Workshop on Hands-free Speech Communication and Microphone Arrays (HSCMA), pp. 197-201, Nancy, France, 2014.

T. Nakatani, et al. Blind speech dereverberation with multi-channel linear prediction based on short time fourier transform representation. Proceedings of ICASSP 2008, pp. 85-88, Las Vegas, NV, 2008.

H. Wu, et al. Sensor fusion using dempster-shafer theory. Proceedings of IEEE Instrumentation and Measurement Technology Conference, pp. 7-12, Anchorage, AK, 2002.

First Action Interview Office Action in U.S. Appl. No. 14/732,711 dated Feb. 22, 2017.

* cited by examiner

MULTI-MICROPHONE SPEECH RECOGNITION SYSTEMS AND RELATED TECHNIQUES

BACKGROUND

This application, and the innovations and related subject matter disclosed herein, (collectively referred to as the "disclosure") generally concern speech recognition systems and associated techniques. More particularly but not exclusively, this disclosure pertains to speech recognition systems having more than one microphone and a recognition engine configured to consider concurrently several versions of a given utterance, and associated processing techniques. As but one particular example, a speech recognition engine can generate several ordered lists of transcription candidates based on several independent streams of a given utterance and a selector can determine a "best" transcription from the lists of transcription candidates. In another particular example, a speech recognition system can concurrently extract likely acoustic features (e.g., phonemes, triphones and corresponding posterior probabilities and/or likelihoods) from each of several versions of an utterance, then combine the posterior probabilities or likelihoods associated with the acoustic features to generate a refined stream acoustic features having improved overall likelihoods. Such a system can apply one or more recognition operations to the stream of such acoustic features to derive a highest-likelihood transcription of the utterance.

Automatic speech recognition (ASR) is especially challenging in the far-field because the direct-path speech signal is impaired by additive noise and reverberation due to additional paths between the talker and microphone. Consequently, word error rates (WER) for a near-field trained system can increase from around 10% when used with a near talker to 60-80% when applied to distant talking. Near-field speech can also be impaired by additive noise and/or reverberation, for example when recorded on a street or in small enclosures or rooms with acoustically reflective walls. In general, WER must be below 15% for a user to reliably execute common home automation tasks (e.g., set a thermostat, turn on sprinklers, send messages, play music, etc.).

In practice, far-field communication with home automation devices encumbers users because they must usually stand near a single receiver and speak towards that receiver. Aside from constraining a users' movement, such limited human-device communications have a subjectively unnatural feeling compared to the more unencumbered human-to-human communications, since the user may not be able to speak directly towards or into a device's microphone to control it.

As one illustrative example, a light switch and a thermostat can have respective receivers and recognition mechanisms. Currently, such devices operate independently of each other and each responds (or attempts to respond) to detected user commands, regardless of whether the detected user commands are intended by the user to be directed to that or another device. Thus, in the light switch and thermostat example, each device could easily (and possibly erroneously) infer that a user has asked it to switch off when the user says "turn the light off." To overcome such errors, users currently must approach and speak directly at or into a given device (e.g., to increase a signal-to-noise ratio received by the respective speech recognition mechanism), as indicated in FIG. 10.

A recorded utterance can reflect a unique combination and selected degree of any number of signal characteristics. Such signal characteristics can include, and each unique combination of signal characteristics can reflect a selected degree of, frequency response, inherent reverberation, background noise, signal-to-noise ratio, signal-to-echo ratio, residual echo, and/or applied signal processing. Signal processing can be applied to a recorded utterance in an attempt to condition the signal for a speech recognition engine. Such conditioning can include suppression and/or cancellation of reverberation, echo, and/or noise. Signal characteristics can also be manipulated and influenced using other available signal processing techniques, including acoustic-beamforming, noise-suppression, de-reverberation, echo-cancelling, echo-suppression, and spatial-noise suppression techniques, and other signal processing techniques.

The effects of applying signal processing techniques on a given recording of an utterance, and the quality or degree of impairment to each unprocessed version of an utterance derived from one or more respective microphones, typically corresponds to a state of the acoustic environment when the recording is made. And, parameters relevant to defining the acoustic environment include, for example, position of each microphone relative to the user making the utterance, position of each microphone and position of the user in relation to walls of the room and other acoustically reflective surfaces and/or objects, room dimensions, presence, position and type of other sound sources, presence, position and type of active loud-speakers, etc.

Interestingly, many of those very signal-characteristics often negatively affect speech recognition systems, causing a decrease in any of several measures of accuracy or quality of recognized speech in relation to a user's actual utterance. Some of the noted signal-characteristics inherently arise from the state of an acoustic environment, and some result (intentionally or unintentionally) from applying a given signal-processing technique to a signal. Speech recognition systems are notoriously sensitive to signal characteristics such as additive noise, reverberation, and non-trivial processing of input utterances. Nonetheless, it is not always apparent which characteristics might be "preferred" by a given recognizer engine in order to achieve improved (or even satisfactory) speech recognition results. For example, signals that produce perceptually "better" or "cleaner" sound to a human listener often do not produce a corresponding "better" (e.g., lower) word-error-rate in a speech recognition system.

Therefore, speech recognition systems with reduced error rates are needed. A need exists for far field receivers that can be distributed spatially throughout a room. As well, a need exists for a new front-end signal processing and speech recognition architecture that combines inputs from the distributed receivers, as well as any available near-field (e.g., mobile) devices, to achieve a desirable WER (e.g., less than or equal to about 15%) regardless of the position or orientation of a user in a given room.

As well, speech recognition systems are needed to resolve intended operations among various devices. More generally, a need exists for speech recognition systems that provide users with a more natural and less attention-consuming experience. There further remains a need for signal processors suitable for use with such speech recognition systems. There also remains a need for speech-recognition techniques suitable for such systems exposed to substantial background noise and/or systems having one or more microphones positioned in close proximity to a noise source (e.g., an air handler of an HVAC system, or one or more loudspeakers). And, a need exists for systems configured to implement such speech recognition techniques.

SUMMARY

The innovations disclosed herein overcome many problems in the prior art and address one or more of the aforementioned or other needs. In some respects, the innovations disclosed herein are directed to speech recognition systems, and more particularly, but not exclusively to speech recognition engines for concurrently processing multiple versions of a given utterance. Some disclosed speech recognition engines concurrently process each of several versions of an utterance with a respective speech recognizer, and other speech recognition engines concurrently process several versions of a given utterance using a fusion technique that adaptively weights selected versions more heavily than other versions. In each of the approaches, the resulting recognized speech can often be a more reliable transcription of the utterance than conventional systems can achieve.

Some disclosed methods and systems provide reliable speech recognition results in distant-talking (e.g., far-field) speech. Such systems can provide a natural interaction of a user with one or more devices (e.g., devices responsive to voice commands).

Acoustically distributed yet functionally centralized speech recognition systems 10, 20, 30 suitable for resolving far-field utterances are disclosed. Some speech recognition systems 10 include a speech recognition engine 200 configured to receive several representations 120*a-m* of an utterance 1 and concurrently to determine one or more highest-probability transcription candidates corresponding to the several representations of the utterance 1.

As indicated in FIGS. 2-7, some disclosed systems 20 include several spatially distributed microphones 110*a-n* associated with a single device 100. As indicated in FIGS. 8-16, other disclosed systems 30 include several spatially distributed devices 102*a*, 102*b*, 102*c*, 102*d*, 104, each having one or more microphones. Each of the distributed devices can have a communication connection with a central processing "hub" 170.

In either type of system, a user's utterance 1 can be received by each microphone 110*a-n*, albeit typically out-of-phase in relation to each of the other microphones because of different distances between the user and the respective microphones, different reverberation paths, etc. Consequently, the several microphones produce different versions of the utterance 1. Different linear combinations of microphones, e.g. via beamforming if microphones are on the same device, can also create different versions. One or more transcription candidates can be generated from each version of the user's utterance 1, as with systems 20 shown and described in relation to FIGS. 2-7. Coming from the same device, the different versions can be time-synchronized, allowing synchronous operations across recognition systems at intermediate points as shown in FIG. 6. With systems 30 shown and described in relation to FIGS. 8-16, one or more acoustic features representative of a given segment of a user's utterance 1 can be generated from each version of the utterance.

In both types of speech recognition systems, each version of the utterance can be processed concurrently with the other versions to identify utterance representations (e.g., transcription candidates as with systems according to FIGS. 2-7 or acoustic features as with systems according to FIGS. 8-16) having a highest likelihood of accurately representing the utterance 1.

Conventional speech recognition systems (e.g., in U.S. Pat. Nos. 6,937,980 and 5,828,997) merely combine the various audio streams to obtain a single audio stream with an increased signal-to-noise ratio as compared to the constituent streams, and subsequently process that single combined signal with a speech recognizer to obtain a transcription. More particularly, such conventional systems do not concurrently process the constituent streams, in contrast to speech recognition engines in systems 20 or feature extraction processors in systems 30.

Some disclosed speech recognition systems include a speech recognition engine configured to receive several representations of an utterance and to determine a highest-probability transcription candidate corresponding to the utterance. Recognition systems can include a selector configured to determine a most-likely accurate transcription from among several high-likelihood transcription candidates corresponding to the several representations of the utterance.

Some speech recognition systems include an utterance acquirer configured to acquire each of the several representations of the utterance and a transmitter configured to transmit the several representations of the utterance to the speech recognition engine. The utterance acquirer can include several microphone transducers, and the several representations of the utterance can be a selected one or more of a recording from each microphone transducer, a linear combination of output signals from each microphone transducer, several linear combinations of output signals from each microphone transducer, and a combination thereof. For example, beamforming techniques can generate several representations of a given utterance across various look directions based on a linear combination of signals obtained from a microphone array.

In some speech recognition systems, the speech recognition engine can include a bank of several constituent recognizers. In some instances, each constituent recognizer can be configured to produce a corresponding ordered list of highest-probability transcription candidates and a corresponding likelihood measure for each respective transcription candidate based on the one or more representations of the utterance. For example, each constituent recognizer can be configured to receive a respective one of the representations of the utterance and to determine one or more corresponding transcription candidates corresponding to the received representation of the utterance. Some constituent recognizers can also determine a likelihood that the transcription candidates correctly transcribe the utterance.

In some cases, one or more of the constituent recognizers can generate intermediate transcription information. A recognition system can also include a parameter updater configured to compare intermediate transcription information from among the constituent recognizers and to revise at least one intermediate transcription information. For example, the updater can remove an intermediate transcription information responsive to a corresponding measure of quality of the at least one intermediate transcription information being beyond a selected threshold measure. For example, the revision to the intermediate transcription information can be a revision, a replacement or a deletion of the at least one transcription information.

In some speech recognition systems, each of the highest-probability transcription candidates can have an associated likelihood of being an accurate transcription of the utterance, and the selector can be configured to determine the most-likely accurate transcription based on a comparison of the associated likelihoods. For example, the determination of the most-likely accurate transcription from among the transcription candidates can be based on a selection of a transcription candidate having the largest likelihood among the several transcription candidates. In other instances, the determination is based on a selection of a transcription candidate having the largest net likelihood among the several transcription candidates, or a selection of a transcription candidate having a largest frequency of being a highest likelihood transcription candidate from each representation of the utterance. In still other instances, the determination can be based on a selection of a transcription candidate having a highest cumulative rank order among the representations of the utterance. In such a system, a rank order for each transcription candidate corresponding to a given representation can correspond to the relative likelihood of the respective transcription candidate compared to the other transcription candidates corresponding to the given utterance.

As noted, some speech recognition engines include several constituent recognizers. In some instances, one or more of the constituent recognizers can have several recognition stages, with each recognition stage being configured to extract several component candidates and intermediate transcription information corresponding to each component candidate. For example, the several recognition stages can include one or more of an acoustic feature extractor, a sub-word assembler, a word modeler, and a composite word modeler. As a further example, a component candidate can be a phoneme candidate and a corresponding posterior probability or likelihood measure. Some component candidates are based on higher-order components, for example biphones or triphones. Some component candidates can be sub-word or word candidates, or even phrase, sentence or paragraph candidates.

An updater can be configured to revise one or more selected component candidates based on a comparison of the intermediate transcription information corresponding to the one or more selected component candidates in relation to the intermediate transcription information corresponding to the other component candidates. As but one example, the updater can delete outlier candidates based on, e.g., the candidate having a posterior probability or likelihood below a selected threshold.

Speech recognition methods are also disclosed. For example, several highest-probability transcription candidates corresponding to each of several representations of an utterance can be determined concurrently. A most-likely accurate transcription from among the transcription candidates corresponding to the 1 representations of the utterance can be selected. In some instances, the act of concurrently determining one or more highest-probability transcription candidates corresponding to each of the 1 representations of the utterance includes concurrently processing each representation of the utterance with a respective different constituent recognizer to determine one or more corresponding highest-probability transcription candidates and an associated likelihood of being an accurate transcription for each transcription candidate.

Each of the highest-probability transcription candidates can have an associated likelihood of being an accurate transcription of the utterance. The act of selecting the most-likely accurate transcription can include selecting from among the transcription candidates a transcription candidate having the largest likelihood among the 1 transcription candidates, a transcription candidate having a largest net likelihood among the 1 transcription candidates, a transcription candidate having a largest frequency of being a highest likelihood transcription candidate from each representation of the utterance, or a transcription candidate having a highest cumulative rank order among the representations of the utterance, where a rank order for each transcription candidate corresponding to a given representation corresponds to the relative likelihood of the respective transcription candidate compared to the other transcription candidates corresponding to the given utterance. Transcriptions can also be compared on the basis of meaning or an intended result in the context of an application. For example, "Turn light on" and "Turn light on now" may have the same desired result in terms of controlling a light fixture. Transcriptions with the same or similar meaning and/or leading to a common result can be considered as being the same. in making the aforementioned comparisons.

The act of concurrently determining several highest-probability transcription candidates can include producing with each of several constituent recognizers an ordered list of highest-probability transcription candidates and a corresponding likelihood measure for each respective transcription candidate. In some instances, each constituent recognizer has several recognition stages, with each recognition stage being configured to extract several component candidates and intermediate transcription information corresponding to each component candidate. In some such instances, disclosed speech recognition methods can also include revising one or more selected component candidates based on a comparison of the intermediate transcription information corresponding to the one or more selected component candidates in relation to intermediate transcription information corresponding to the other component candidates.

In some disclosed speech recognition methods, the several representations of the utterance can be generated from an output signal from each of several microphone transducers. For example, the 1 representations can include a selected one or more of a recording from each in the several microphone transducers, a linear combination of the output signals from the several microphone transducers, several linear combinations of the output signals the several microphone transducers, and a combination thereof.

Non-transitory, computer-readable media can contain instructions that, when executed by a processor, cause a computing environment to perform a disclosed speech recognition method.

Some speech recognition systems for resolving far-field utterances have a speech recognition engine configured to concurrently receive several representations of an utterance and to determine a highest-probability representation of the utterance. Such systems also can include an utterance decoder configured to determine a most-likely transcription of the utterance corresponding to the highest-probability representation of the utterance.

In some instances, the utterance representations are several acoustic features, each having a corresponding posterior probability or likelihood. For example, such acoustic features can be phonemes, biphones, triphones, etc. In other instances, such acoustic features can be sub-words, words, or even a combination of the different types of acoustic features listed above.

Such utterance representations and their corresponding posterior probabilities can be concatenated into a single stream of representations. The concatenated stream of utterance representations can be transmitted to the recognition engine. The recognition engine can be configured to determine the highest-probability representation of the utterance based in part on a combination of the several posterior probabilities corresponding to the utterance representations. In some cases, the recognition engine adaptively (e.g., more heavily) weights utterance representations having relatively higher signal-to-noise ratio as compared to utterance representations having relatively lower signal-to-noise ratio.

Some selectors are based on a deep-neural-network configured to combine the 1 posterior probabilities to identify those acoustic features having a highest-probability of correctly representing the utterance. The deep-neural-network can include a naïve Bayes classifier applied to the 1 posterior probabilities, a Dempster-Shafer belief function, or both. Deep-neural networks incorporating both a naïve Bayes classifier and a Dempster-Shafer belief function can be configured to adaptively apply a relative weighting as between the Bayes classifier and the Dempster-Shafer belief function, allowing the system to adaptively respond to a user's movements, e.g., through a room.

Some speech recognition systems have a recognition parameter store. The recognition parameter store can have an acoustic feature dictionary, a language model, or both.

An utterance decoder can be configured to combine one or more recognition parameters from the recognition parameter store with the highest-probability utterance representations identified by the selector. Where the several utterance representations include several acoustic features, each having a corresponding posterior probability or likelihood, the utterance decoder can be configured to combine the one or more recognition parameters from the recognition parameter store with the highest probability acoustic features.

For example, in systems where the several utterance representations are several phonemes, the acoustic feature dictionary can be a phonetic dictionary. Some utterance decoders have a hidden Markov modeler, e.g., for assessing likelihoods of different combinations of phonemes.

Distributed speech recognition systems are disclosed. Some distributed speech recognition systems include a hub configured to receive several streams of acoustic features and corresponding posterior probabilities representative of a given utterance. Each stream can originate from a different acoustic feature extractor (e.g., each of several devices in a home-theater system can have an acoustic feature extractor configured to extract acoustic features from a given audio stream). An aggregator can aggregate the several streams and corresponding posterior probabilities into a lesser number of streams, with one concatenated stream being but a specific example. A communication connection can convey the concatenated streams and corresponding posterior probabilities to a speech recognition engine configured to select from the aggregated streams those acoustic features most likely to accurately reflect a user's utterance and to transcribe the utterance based on the selected acoustic features.

Some distributed speech recognition systems also include several utterance acquisition receivers, each being configured to digitize a received audio signal. For example, each of several devices commonly found in a home environment can include one or more microphones. Some of those devices also can include an analog-to-digital converter for digitizing the received audio signal. Such devices can also include one or more acoustic feature extractors configured to extract acoustic features and associated posterior probabilities from the digitized audio signals. For example, a given device can include a near-field acoustic-feature extractor, a far-field acoustic-feature extractor, or both.

The devices can also be configured to stream the extracted acoustic features and associated posterior probabilities to the hub. The hub can be configured to synchronize the 1 received streams of acoustic features and associated posterior probabilities with each other. For example, the streams can arrive at the hub out of phase with each other, and the hub can bring them into phase before aggregating the streams. Alternatively, such synchronization can occur elsewhere in the system (e.g., by the selector or any other of the components of disclosed speech recognition systems).

In disclosed systems, a highest-probability representation of an utterance can be selected from among several representations of the utterance. A most-likely transcription of the utterance can be determined in correspondence to the highest-probability representation of the utterance. For example, each of the utterance representations can have an associated posterior probability, and the several posterior probabilities corresponding to the utterance representations can be combined to identify a highest-probability representation of the utterance. In some instances, utterance representations having relatively higher signal-to-noise ratio can be more heavily weighted as compared to utterance representations having relatively lower signal-to-noise ratio when determining the highest-probability representation.

The several posterior probabilities can be combined with each other using a deep-neural-network processor configured to identify the acoustic features having a highest-probability of correctly representing the utterance. Such a deep-neural-network can apply a naïve Bayes classifier, a Dempster-Shafer belief function, or both, to the plurality of posterior probabilities. A relative or adaptive weighting can be applied as between the Bayes classifier and the Dempster-Shafer belief functions.

According to some disclosed methods, one or more recognition parameters from a recognition parameter store can be combined with the highest-probability utterance representations.

Also disclosed are tangible, non-transitory computer-readable media including computer executable instructions that, when executed, cause a computing environment to implement a disclosed speech recognition method. Digital signal processors are also disclosed.

The foregoing and other features and advantages will become more apparent from the following detailed description, which proceeds with reference to the accompanying drawings.

BRIEF DESCRIPTION OF THE DRAWINGS

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation.

DETAILED DESCRIPTION

Figure 1:
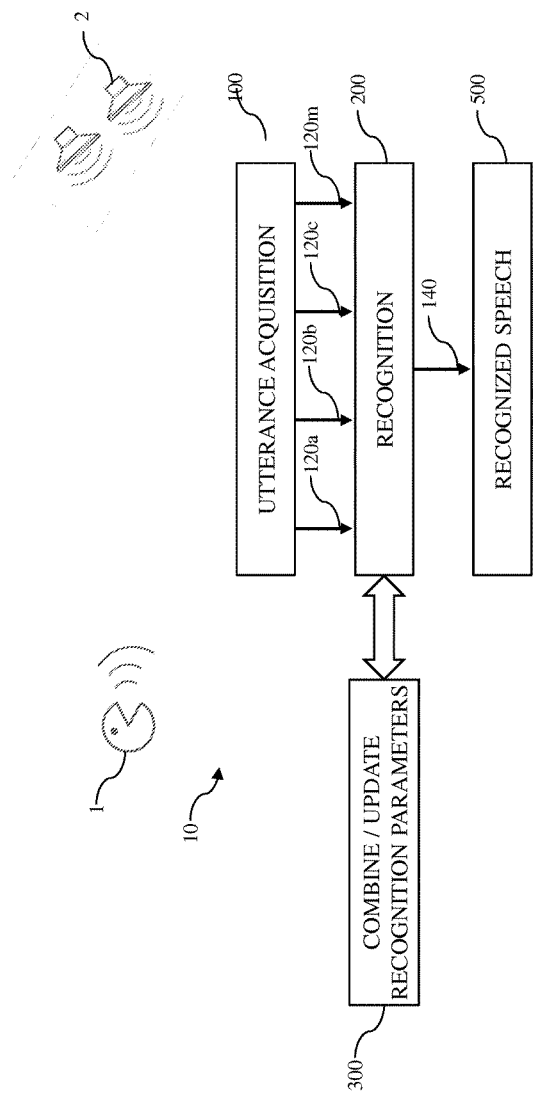
FIG. 1 shows a block diagram of a disclosed speech recognition system.
Figure 2:
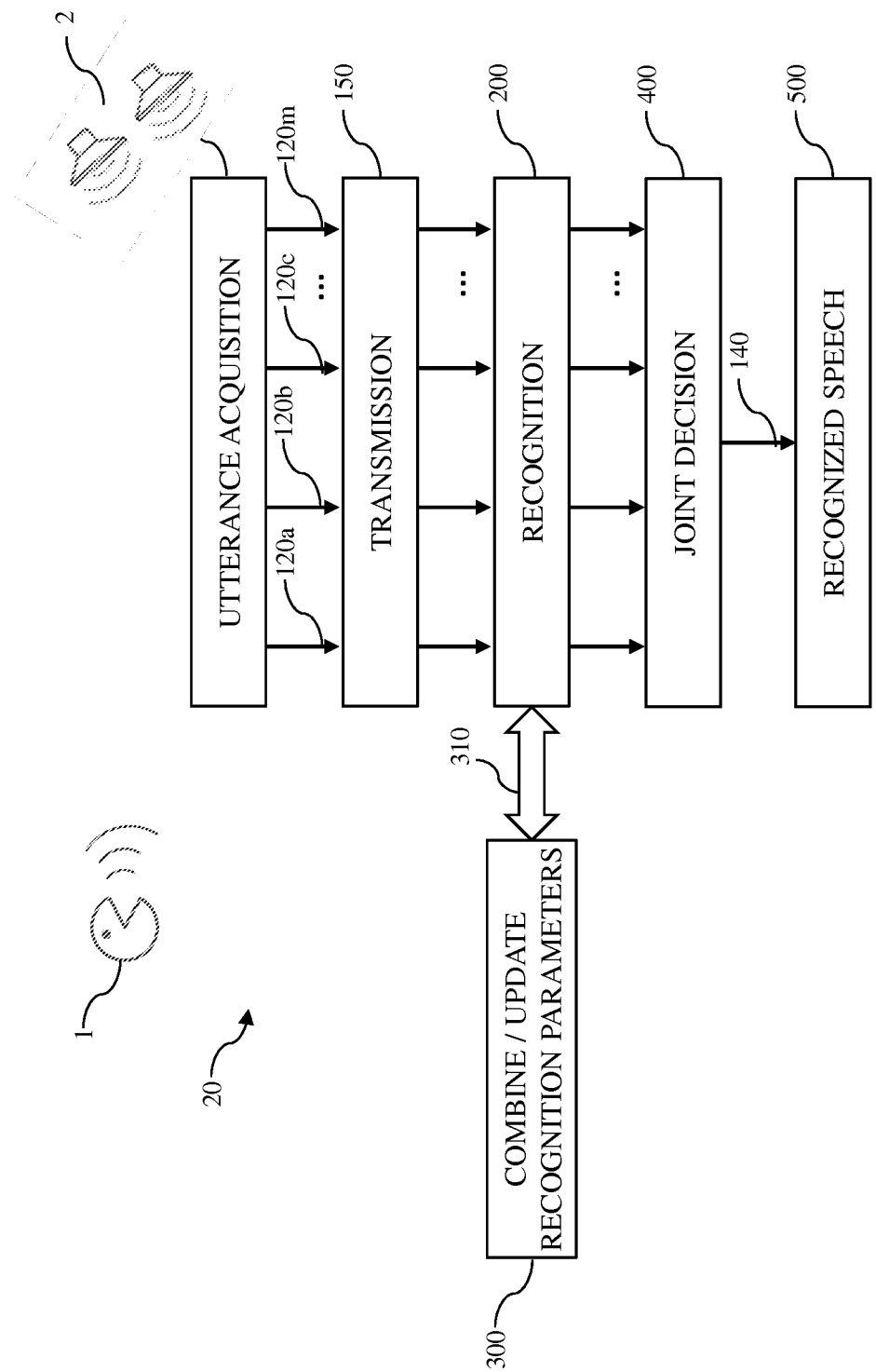
FIG. 2 shows a block diagram of an embodiment of the speech recognition system illustrated in FIG. 1.

The following describes various innovative principles related to speech recognition systems and processing, and related signal processors, by way of reference to specific speech recognition system embodiments, which are but several particular examples chosen for illustrative purposes. More particularly but not exclusively, disclosed subject matter pertains to systems for concurrently processing several versions of a given utterance and selecting from among the several processed versions a transcription of the utterance having a high-likelihood of being a correct transcription of the utterance.

Several options for measuring whether or to what extent a transcription candidate might be "a correct transcription" are discussed more fully below. However, it bears noting here that a transcription candidate can be measured according to whether or to what extent the candidate accurately reflects the speaker's utterance on a word-for-word basis. Another measure is whether or to what extent an interpretation (e.g., a meaning) of a given transcription candidate reflects the meaning of the speaker's utterance, notwithstanding that a given transcription candidate does not match the utterance on a word-for-word basis. Other measures of "correctness" are possible.

Thus, as used throughout this disclosure and in the claims, discussion of whether or to what extent a transcription candidate correctly reflects an utterance contemplates any of various measures of "correctness," unless the context of any particular discussion expressly is limited to one or more particular measures to the exclusion of other measures.

Nonetheless, one or more of the disclosed principles can be incorporated in various other signal processing systems to achieve any of a variety of corresponding system characteristics. Techniques and systems described in relation to particular configurations, applications, or uses, are merely examples of techniques and systems incorporating one or more of the innovative principles disclosed herein. Such examples are used to illustrate one or more innovative aspects of the disclosed principles.

Thus, speech recognition techniques (and associated systems) having attributes that are different from those specific examples discussed herein can embody one or more of the innovative principles, and can be used in applications not described herein in detail, for example, in "hands-free" communication systems, in aviation communication systems, in conference room speaker phones, in auditorium sound systems, in hand-held, gaming or other consoles, home theater systems, etc. Accordingly, such alternative embodiments also fall within the scope of this disclosure.

I. Overview

Unlike conventional systems, disclosed speech recognition systems 10, 20, 30 use multiple microphones and concurrent processing of various signals from the microphones to improve speech recognition accuracy in challenging acoustic environments (e.g., where large distances separate a user from a microphone transducer, in reverberant rooms, and/or where substantial background noise impairs the speech signal, or utterance). More particularly, disclosed systems exploit the availability of multiple microphones to obtain several different versions of a given utterance 1. As well, disclosed systems can exploit concurrent processing of those several different versions to derive accurate transcriptions of the utterance.

As used herein, the phrase "microphone transducer" (colloquially a "mic" or "mike") is an acoustic-to-electric transducer or sensor that converts sound (e.g., acoustic energy) into an electrical signal (e.g., electrical energy).

The characteristics of a given signal arising from a recorded utterance can arise from a large number of influences, none of which is necessarily quantifiable or predictable a priori, or even controllable. And, the optimal degree and/or type of signal processing to apply to the signal to achieve optimal (or at least high-performance) speech recognition results also are not easily predictable.

Disclosed speech recognition systems address those and other difficulties by concurrently processing several versions of a given utterance, sometimes with a unique technique applied to each version. Stated differently, disclosed approaches involve joint-recognition systems that process several audio versions of the same utterance simultaneously.

As shown in FIGS. 1-16, acoustically distributed yet functionally centralized speech recognition systems 10, 20, 30 suitable for resolving far-field utterances are disclosed. Some speech recognition systems 10 include a speech recognition processor (or engine) 200 configured to receive several representations (or streams) 120*a-m* of a given impaired signal combining an utterance 1 and background noise 2. The recognition engine 200 is configured to apply one or more signal processing techniques to each stream 120*a-m* to determine, concurrently, one or more highest-probability transcription candidates based on the several representations of the utterance 1.

A system 10, 20, 30 having multiple microphones allows the system to concurrently produce (e.g., record or stream) several different versions of a given utterance. And, the availability of multiple processing options allows each of the several versions of the utterance to be processed concurrently with the other versions. Each version of the utterance can reflect a unique combination of intended signal and impairment signal (and a given degree of each), resulting in any number of quantifiable but unique signal characteristics. Each processor, in turn, can (but need not) apply a unique type or strength of processing to each of the several versions of the utterance. By processing each version of the utterance concurrently, likely transcription candidates can be identified in relation to the different versions of the utterance, and a most-likely (e.g., accurate) transcription candidate can be selected or determined.

For example, systems 20 shown in and described in relation to FIGS. 2-7 have recognition engines 200 that concurrently run multiple speech recognition processors to derive several transcription candidates from each of several versions of a given utterance. A selector 400 subsequently derives or otherwise identifies a highest-likelihood transcription candidate from among the several transcription candidates generated by the recognition engine 200

As another example, systems 30 (shown in and described in relation to FIGS. 8-16) concurrently extract likely acoustic features (e.g., triphones and corresponding posterior probabilities) from each of several versions of an utterance, then fuse the posterior probabilities associated with the acoustic features to generate a stream of most-likely acoustic features. The systems 30 then apply one or more recognition parameters to the stream of most-likely acoustic features to derive a highest-likelihood transcription of the utterance.

In either type of system, a user's utterance 1 and background noise (or other impairment signal) 2 can be received by each of several microphones (110a-n in FIG. 3, 110a-f, 110a-g in FIG. 11), albeit typically out-of-phase in relation to each of the other microphones because of, for example, different distances between the user and the respective microphones, different reverberation paths, etc. As a consequence, each microphone provides a different version of the combined utterance 1 and noise 2. Often microphones on a given device will be closely spaced. Therefore, though different versions have potentially difference phases the streams coming from a single microphone array on a single device can be very much synchronous and aligned in time from the point of view of feature extraction at a recognizer.

Each version of the utterance can be processed concurrently with the other versions of the same utterance to identify several utterance representations (e.g., transcription candidates as with systems according to FIGS. 2-7 or acoustic features as with systems according to FIGS. 8-16). Each of the utterance representations can be associated with a measure of, for example, quality or accuracy (e.g., a statistical measure of accuracy), and the disclosed systems can output the "best" representation(s) of the utterance.

Although systems 20 are described in connection with a single device having a microphone array, the microphone array 110a-n shown in FIG. 3 can be distributed between (or among) two or more devices, similarly to the distributed microphones depicted in FIGS. 9 and 11. The outputs from the distributed array corresponding to a given utterance can be synchronized by one or more of the devices (or by a different device) to generate the several versions 120a-m of the utterance that are transmitted to the recognition engine 200 (e.g., in FIG. 2).

In systems 20, 30 with several distributed devices, each having one or more microphones, system-wide phase-relationships among the various microphones generally can correspond to source (e.g., user) position within a given environment (e.g., a room 3). Accordingly, training such a system can include establishing phase-relationships among the various microphones by repositioning a source throughout the intended environment and observing the various phase-relationships among microphone signals.

In addition to resolving a globally "best" transcription from among several utterance candidates corresponding to each of several audio streams, as described above, disclosed systems having spatially distributed devices can coordinate responses among "smart" devices. Such coordination can provide refined operation among various devices compared to prior-art systems.

For example, a light switch and a thermostat (or any other "smart" device) can each have its own microphone transducer as part of a distributed speech recognition system. Each device can transmit a stream of whatever portion of an utterance it receives to a central speech recognition hub, and the distributed speech recognition system can return recognized speech (e.g., in the form of a command) directed to one or both of the light switch and the thermostat. With such a distributed and coordinated system, error rates (e.g., as measured by mistaken inferences of a user's utterance) can be significantly reduced. More particularly, centralized recognition systems 10, 20, 30 applied to spatially distributed devices, as disclosed herein, can reduce compounding of recognition errors (e.g., resulting from poor resolution of far-field utterances, or lack of discernment from among multiple, un-correlated devices). As well, centralized recognition systems of the type described herein can resolve intended operations among various devices, providing a more natural and less attention-consuming user experience in relation to the various devices.

As used herein, the phrase "recognized speech" means an output from an automated speech recognizer. Often, but not exclusively, recognized speech can be output in response to a detected human utterance. As several examples among many, recognized speech can include an automatically generated transcription of a human-intelligible expression of a concept. Such a transcription can be in the form of text, sound, imagery, a three-dimensional item, as from a so-called "3-D printer," a data structure or data, or a machine-executable instruction that, when executed, causes a special-purpose or a general-purpose computing environment to perform a selected method (e.g., set a temperature on a thermostat, to turn lights on or off, or any of myriad other machine-implemented methods now known or hereafter developed. The foregoing examples of recognized speech are illustrative only and non-limiting. Other examples of recognized speech will be readily apparent to those of ordinary skill in the art following a review of this disclosure.

A threshold between near-field and far-field speech can be based on a distance between a talker and a receiver or microphone transducer. Representative threshold are between about five feet and about twenty feet, with between about 12 feet and about 16 feet being a representative range containing a threshold between near- and far-field. In some instances, a distance between a talker and a transducer generally outside the talker's reach (e.g., any distance greater than about 3 or 4 feet) can define a threshold between near-field and far-field speech.

II. A Speech Recognition System Having a Bank of Recognizers

Referring now to FIGS. 2-7, a speech recognition system 20 can have a recognition engine 200 with a bank of concurrently operable recognizers, and a joint selector 400 for selecting one from among several transcription candidates produced by the recognition engine. As explained more fully below, an updater 300 can combine and/or update intermediate results from the bank of recognizers in the recognition engine 200. An output 140 from the selector 400 can be the system's 20 output of recognized speech. Or, subsequent processing can be applied to the output 140, e.g., to derive a machine-executable instruction from a textual output from the selector 400.

In a general sense, such speech recognition systems can resolve near- and/or far-field utterances. However, disclosed systems are particularly suitable in context of distant talking A. Utterance Acquisition FIGS. 2-7 illustrate that some disclosed speech recognition systems 20 include several spatially distributed microphones associated with a single device 100. FIG. 3 shows the speech recognition system 20 having a microphone array with a selectable number of N microphones 110$a$-$n$.

As used throughout this description and in the several drawings, selectable integer values are identified by the following capital letters: N, M, F, G and P. Index values associated with the selectable integer values are represented by the lower case letters n, m, f, g and p, and range between 1 and the respective integer value. For example, a microphone array can have 8 microphones. In that example, N=8, and any one of the microphones could be indicated as 110$n$. Consistent with this notation, the microphone array in FIG. 3 indicates a microphone array having any integer number, N, of microphones, although only five microphones are expressly indicated. In particular, microphone arrays having more or fewer than five microphones are expressly contemplated, and this is indicated by the foregoing convention. Other aspects of speech recognition systems can have selectable numbers of features, and those are depicted in the drawings and described herein using the foregoing convention applied to letters different from "N" and "n."

Because each microphone 110$a$-$n$ is spaced apart from the other microphones, each microphone observes a given utterance 1 (and any impairment signal 2) slightly differently than the other microphones. Thus, the presence of multiple microphones 110$a$-$n$ and multiple processing options 130$a$-$m$ can allow the system 20 to obtain different recorded versions of a given utterance 1, and a user does not have to repeat the utterance to provide the system 20 with several versions of the utterance 1.

After recording and before presenting the respective versions of the utterance to the recognition engine 200, characteristics of the observed utterance and impairment signals can be manipulated. For example, the utterance acquirer 100 can have a plurality of M processors 130$a$-$m$. Each processor can apply one or more signal processing techniques to each version, or to combined versions, of the utterance 1.

Figure 3:
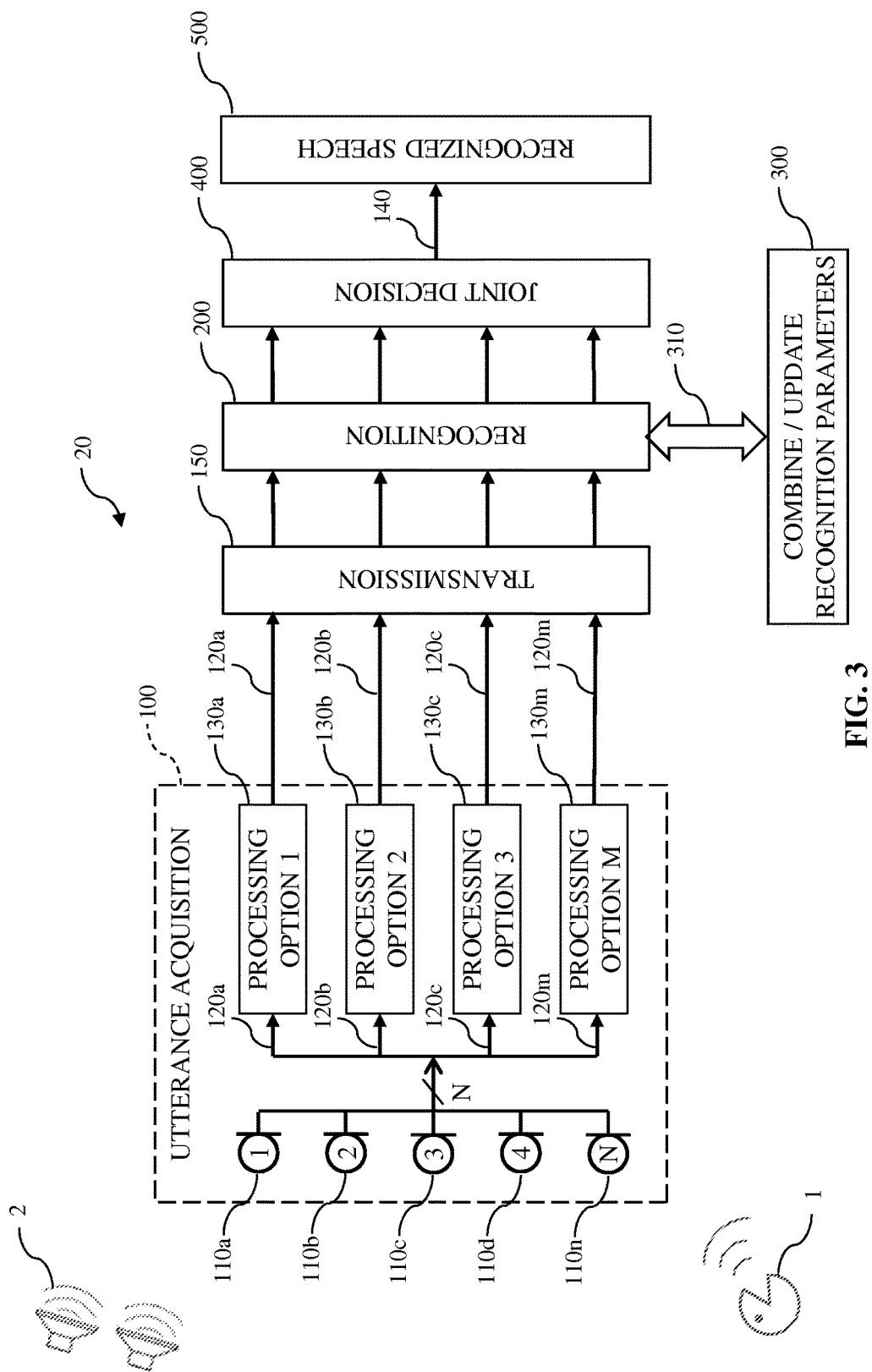
FIG. 3 shows a block diagram of an embodiment of the speech recognition system illustrated in FIG. 2. More particularly, but not exclusively, aspects of an utterance acquirer are shown.
Figure 4:
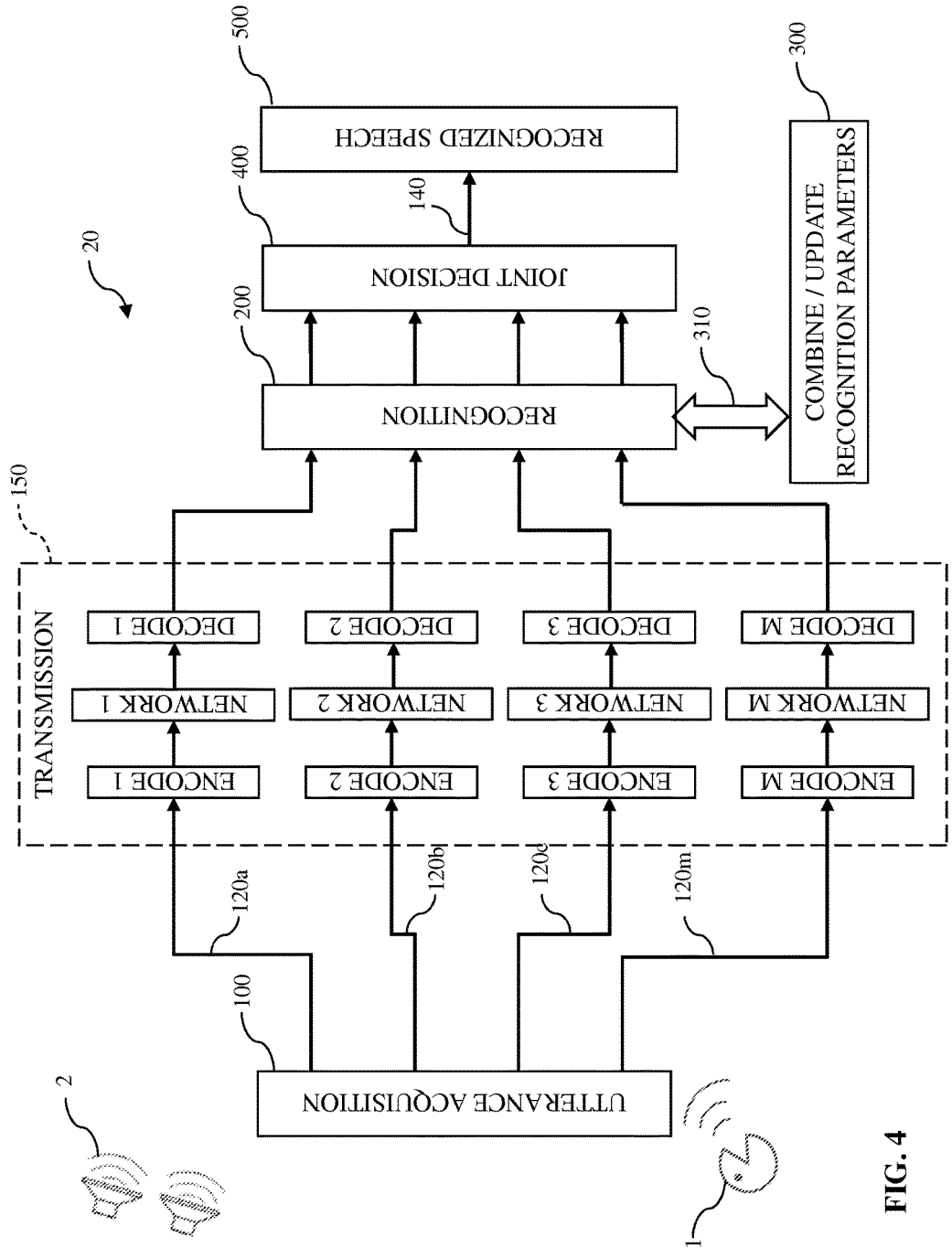
FIG. 4 shows a block diagram of an embodiment of the speech recognition system illustrated in FIG. 2. More particularly, but not exclusively, aspects of a transmitter are shown.

For example, one or more echo cancelers, echo-suppressors, noise-suppressors, de-reverberation techniques, linear-filters (EQs), and combinations thereof, can be applied to a selected one or more of the utterance versions, resulting in M respective streams 120$a$-$m$ (FIGS. 3 and 4). And, each processing option 130$a$-$m$ can apply selected tuning-settings. As but one example, a setting of particular interest can be a relative strength and/or aggressiveness of suppression or de-reverberation applied to a given signal.

Accordingly, the number of versions M of the utterance 1 transmitted to the recognition engine can differ from (or be the same as) the number N of microphones in the microphone array. As but one example, beamforming techniques applied to output signals from a given plurality of microphones 110$a$-$n$ can generate an independent plurality of M audio streams 120$a$-$m$ across M "look directions."

More generally, different versions of a given utterance 1 can be generated using various approaches. For example, each version can simply be, or result from, a recording obtained from one microphone, or a specific group of microphones. Alternatively, with an array of microphones 110$a$-$n$, as shown in FIG. 3, each version of the utterance 1 can correspond to a given beam derived using a beamforming technique (e.g., a "beam" can result from a particular linear combination of signals produced by the array of microphones 110$a$-$n$). Beamforming can provide acquisition sensitivity in a desired spatial direction, can reject unwanted signals, and often provide a degree of colorization of the signal and/or unwanted signals in the frequency domain.

During operation, some microphones might be closer to a given talker than others of the microphones. Additionally, some microphones might be closer to a loudspeaker or other source of noise. Accordingly, each microphone (or beam direction) can observe, and encode in an emitted signal, unique characteristics reflecting a unique mixture of intended utterance and signal impairment (as from background noise). Thus, a recognition engine might yield better speech recognition results using some microphones or beam directions as compared to other microphones or beam directions. That being said, every direction or microphone can suffer some degree of impairment, and that degree of impairment can vary according to, for example, activity in the room 3. Additionally, it is difficult or impossible to specify, a priori, those impairments that are relatively least disruptive to a given recognition engine.

Disclosed speech recognition systems address such difficulty by concurrently processing multiple versions of a given utterance and selecting a transcription candidate reflective of a "best" (e.g., lowest likely error) transcription. With systems 20 shown in FIGS. 2-7, the recognition engine 200 can concurrently process each audio stream 120$a$-$m$ with the other audio streams to decode several utterance candidates (e.g., transcription candidates or intermediate transcription candidates) from each stream. The selector 400 can determine a globally "best" transcription (e.g., based on highest overall likelihood) from among the utterance candidates.

B. Transmission

FIG. 4 illustrates a possible arrangement of a communication connection 150 suitable for use in a system 20. The illustrated connection 150 is configured to encode, to transmit to the speech recognition engine 200, and to decode each of the audio streams 120$a$-$m$ output from the utterance acquirer 100. Such a communication connection can be used when the recognition engine 200 is positioned remotely from the utterance acquirer, as through a bandwidth-constrained network.

Several audio—or more particularly speech—, coding options can be implemented in the processing options. Different transmission networks can also be considered.

For example, lower coding rates could be sent over a more Quality of Service (QoS) guaranteed network (e.g., with low delay), while higher coding rates could be sent over another network (e.g. a best effort network with high delay). By way of background, a network or protocol that supports QoS may agree on a traffic contract with the application software and reserve capacity among network nodes, for example during a session establishment phase. During the session it may monitor the achieved level of performance, for example the data rate and delay, and dynamically control scheduling priorities among network nodes. It may release the reserved capacity during a tear down phase. A best-effort network, on the other hand, does not support QoS. An alternative to complex QoS control mechanisms is to provide high quality communication over a best-effort network by over-provisioning the capacity so that it is sufficient for the expected peak traffic load.

Some embodiments of the system 20 can determine whichever version of stream coding arrives at the recognition engine 200 with sufficient time, making the system opportunistic in the amount of streams it may process with recognizers.

As well, the diversity of audio- or speech-coding options also represent different processing options that can be considered and leveraged using a multiple stream approach. For example, at lower rates, speech coders can often provide higher fidelity if the utterance recording has been processed less and has less additive impairments, such as additive noise and reverberation. Conversely, when there are impairments 2 or heavy processing on the recording, audio coders may provide better recognition results when processed by the recognition engine. This is particularly likely at higher rates and also possible at lower rates. Accordingly, it is believed the recognition engine can provide improved transcription accuracy when the communication connection 150 uses an audio coder on some utterances in a particular scenario, and improved transcription accuracy when the communication connection 150 uses a speech coder on other utterances in other scenarios.

Making a priori determinations of which scenarios will yield better recognition results with speech or audio coding can be difficult. However, concurrent processing of utterance streams using both types of coding in the recognition engine 200 can resolve the issue ex post.

C. Recognition Engine

Figure 6:
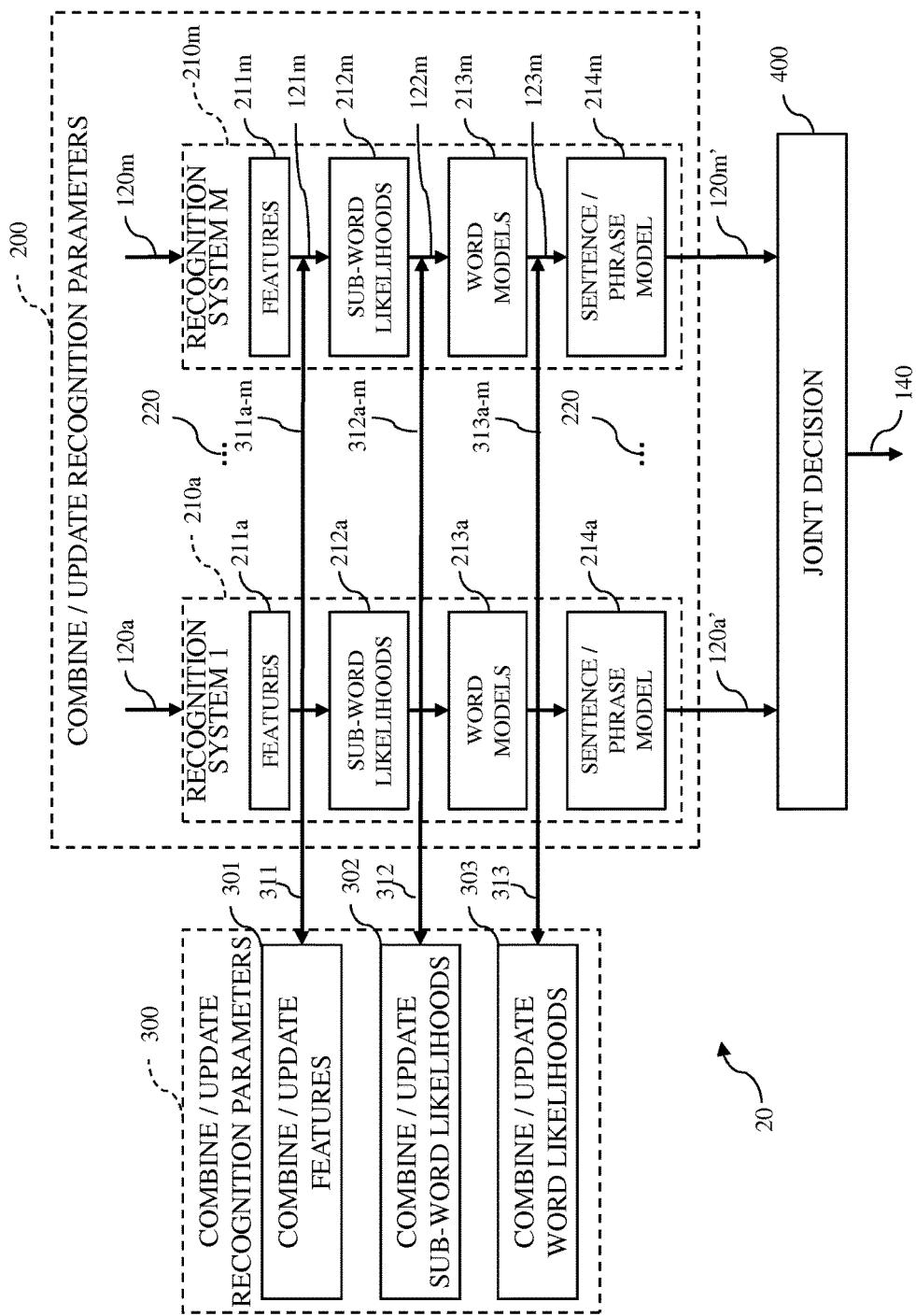
FIG. 6 shows a block diagram of an embodiment of the speech recognition system illustrated in FIG. 2. More particularly, but not exclusively, aspects of a recognition engine and an updater, as in FIG. 5, are shown.
Figure 7:
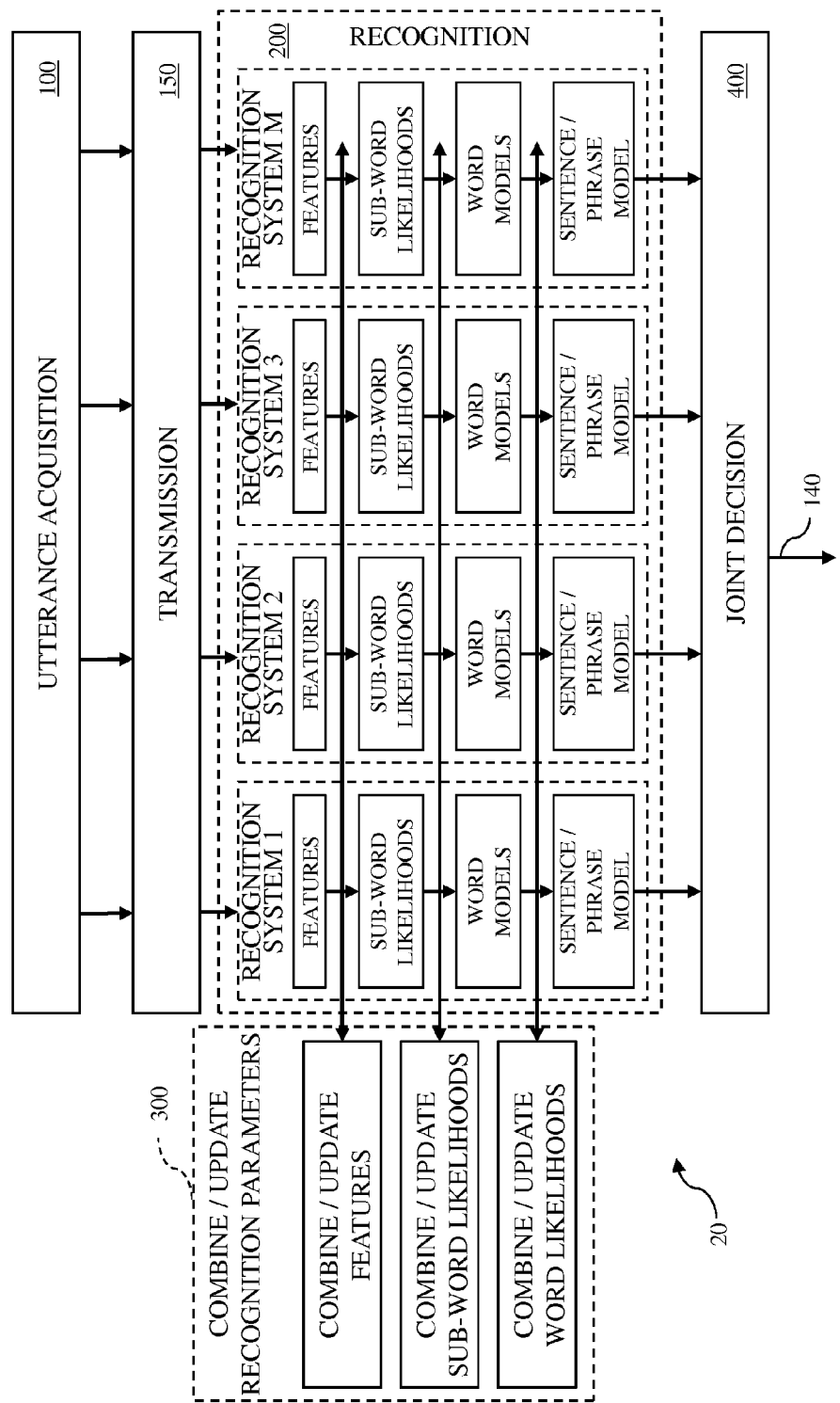
FIG. 7 shows another block diagram of the embodiment shown in FIG. 6.

A recognition engine 200 can have several speech recognizers configured to process each stream 120$a$-$m$ of the utterance 1 currently with the other versions. Concurrent processing of each stream 120$a$-$m$ permits joint consideration of the various resulting transcription candidates 120$a'$-120$m'$ (FIGS. 6 and 7). Such joint consideration can occur after transcription candidates have been derived from the different audio streams 120$a$-$m$, or can occur during selected intermediate stages of the recognition processing. In particular when the different streams all arise from the same device, with a given sample rate clock, and from microphones positioned relatively close to one another, at the feature, phoneme and word levels of the recognition system the streams can be aligned and information kept time synchronous. For example, intermediate results generated by two or more concurrent recognizers 210$a$-$m$ can be compared, revised and/or updated in relation to each other. The joint consideration of independently generated transcriptions, whether after complete processing of each stream 120$a$-$m$ independently, or at one or more intermediate stages of processing, can improve overall transcription accuracy of the recognition engine 200.

Figure 5:
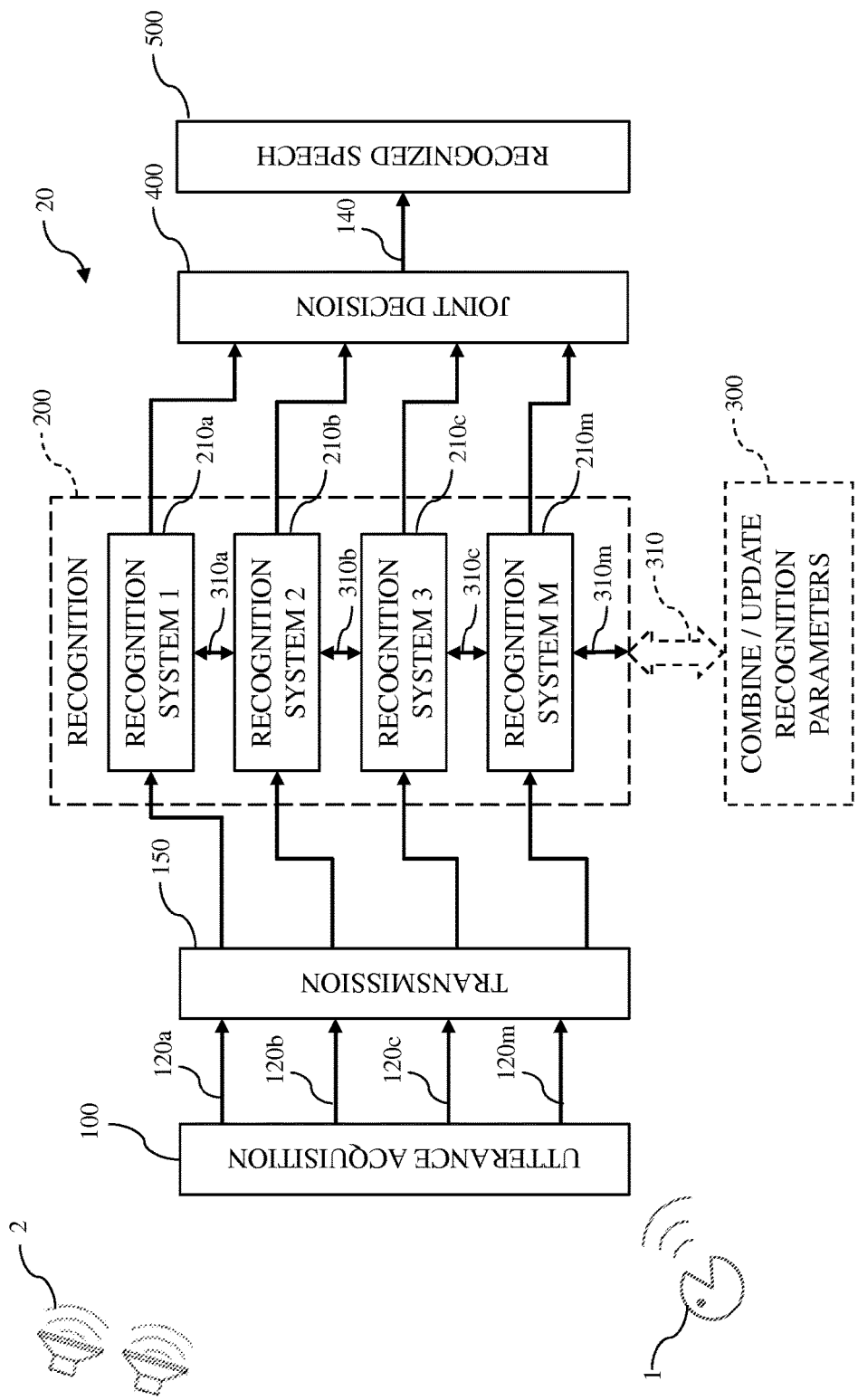
FIG. 5 shows a block diagram of an embodiment of the speech recognition system illustrated in FIG. 2. More particularly, but not exclusively, aspects of a recognition engine are shown.

As shown in FIG. 5, the recognition engine 200 can have several constituent recognizers 210$a$-$m$ (sometimes collectively referred to as a "bank" of recognizers). Each constituent recognizer can be configured to receive a respective one or more of the utterance representations 120$a$-$m$ (whether directly from the utterance acquirer 100 or after being decoded by an intermediate communication connection 150). Each constituent recognizer 210$a$-$m$ can determine one or more corresponding transcription candidates corresponding to the received representation of the utterance, and, for each transcription candidate, to determine an associated likelihood of being an accurate transcription of the utterance. In some instances, each constituent recognizer is configured to produce a corresponding ordered list of highest-probability transcription candidates and a likelihood measure for each respective transcription candidate.

Although the system 20 is described as having the same number M of recognizers as the utterance acquirer has processors 130$a$-$m$, the number of constituent recognizers 210 in the recognition engine 200 can differ from the number M of processors 130$a$-$m$. For example, if the recognition engine 200 has fewer than M recognizers, one or more streams 120$a$-$m$ can be eliminated altogether or combined with another (or more than one other) of the streams 120$a$-$m$ and eliminated after being combined to match the number of incoming streams to the number of available recognizers.

FIG. 6 shows a recognition engine 200 having a bank of recognizers 210$a$-$m$, each having several representative and intermediate processor stages. For example, a first stage in each recognizer is indicated as being an acoustic feature extractor 211$a$-$m$. A second stage is a sub-word modeler 212$a$-$m$. Each recognizer 210$a$-$m$ also has a corresponding word modeler 213$a$-$m$ and a phrase- or sentence-modeler 214$a$-$m$. Each audio stream 120$a$-$m$ can be processed by each of the stages, and each recognizer 210$a$-$m$ can produce information regarding a certainty or uncertainty of each generated intermediate transcription portion (e.g., acoustic features, sub-words, words, phases, etc.), as expressed through likelihoods of various hypotheses.

Results from intermediate stages of the recognition engine 200 provide an opportunity to share and/or refine intermediate information. It is not necessary that all such stages be considered for sharing/refinement. However, at least one stage can see such sharing.

Each recognizer 210$a$-$m$ in the bank shown in FIGS. 6 and 7 is identically configured to the others, but they need not be identically configured. Moreover, even in instances where the recognizers are identically configured, each processor of counterpart stages (e.g., processors 211$a$ and 211$m$) among the recognizers 200$a$-$m$ can be designed differently, e.g., to process each stream differently from the other streams at the given stage. Different designs can simply be different underlying models or settings of statistics, as can be the result when recognizers are trained for different uses and/or on different data.

By considering likelihoods across the several concurrently processed streams 120$a$-$m$, and by refining or comparing likelihoods in an organized manner, the recognition system 20 can produce improved transcription results compared to conventional speech recognition systems.

The recognition engine 200 shown in FIG. 6 can process the received audio streams 120$a$-$m$ independently of each other to produce several corresponding streams of transcription candidates 120$a'$-120$m'$. Alternatively, the recognition engine 200 shown in FIG. 6 can compare, refine and/or otherwise revise intermediate results after processing by each recognizer stage 211$a$-$m$, 212$a$-$m$, 213$a$-$m$, 214$a$-$m$, as explained more fully below.

D. Updater

For example, each stage of the recognizers 210$a$-$m$ can concurrently process the several versions of the utterance 120$a$-$m$. After each such stage, processing results can be compared among the recognizers 210$a$-$m$ and refined and/or otherwise revised before the intermediate results are processed by the subsequent stage.

Communication between the recognition engine 200 and the updater 300 is indicated by the double-ended arrow 310 shown in FIGS. 2, 3, 4 and 5, and can take any suitable form for facilitating an exchange of information between the engine 200 and the updater 300. Heavy arrows throughout the several drawings, with the arrows labeled 120a-m in FIGS. 3 and 311, 312 and 313 in FIG. 6 being but several particular examples, indicate a flow of data between components of the illustrated speech recognition systems. Broad double-ended arrows, with the arrow labeled 310 in FIG. 3 and the unlabeled arrow shown in FIG. 17 being particular examples, indicate a communication channel over which data can be transferred.

As indicated in FIG. 6, each recognition stage can be configured to extract one or more component candidates and intermediate transcription information corresponding to each component candidate. The updater 300 can compare the component candidates and intermediate transcription information from a given recognizer stage or among stages of different recognizers. For example, the updater can have processors 301, 302 and 303 to compare, refine, or otherwise revise results after front-end processing of the streams 120a-m, after features are tagged with likelihoods of sub-word units, and/or after word models are incorporated to determine candidate words and their likelihoods. Similarly, results from the streams can be compared after language models are considered, e.g. after candidate phases or sentences have been processed. However, the updater need not compare and/or revise intermediate results from the recognizers after every stage.

In a general sense, however, a decision to refine or otherwise revise a given intermediate result generated by any of the recognizer stages can be based on a measure of quality of the intermediate result being beyond a selected threshold measure. For example, a likelihood from a given model/feature is a natural measure by which to compare results (intermediate and/or final) among different streams.

Other measures include, distance metrics between various features. Although streams can be naturally time-aligned with each other, and thus the time-domain sequence of features from different streams can align and correspond to features of a given acoustic event, given differences in acquisition (e.g., phase differences among microphones) and processing, there can be feature-differences among the streams, and some can be significant. Some known distance metrics can be used to indicate whether features, e.g., spectrally related features, are close in distance to each other. Depending on the domain used, other examples of useful measures can include weighted cepstral distance, Itakura-Saito likelihood distortion, log-spectral distortion (on linear frequency scales, warped frequency scales, or both).

A general goal of intermediate comparison and refinement or other revision is to increase confidence in the processing results at various stages while allowing each stage to maintain some degree of difference (or diversity) among the information contained in the streams and decisions made thereon. For example, outliers, e.g., sub-words or words which show atypically low likelihoods, or features which seem atypical because of large distances from those of other recognizers, can be removed in an attempt to improve the individual behavior of each recognizer while maintaining independence among the streams being processed.

This can be helpful, for example, in noise suppression. If a particular noise suppressor makes an over-estimation of the noise spectrum in a given frame of audio one could expect that such a noise-suppressor may damage the underlying utterance-signal components for that frame. One can "repair" that frame by using another stream. In an attempt to discover when a "repair" might be appropriate, information from other recognizers can be considered.

Another example is after feature extraction. Appropriate distances between features from different recognizers can be compared, and if features show natural clusters then a recognizer can replace its original feature by some "centroid" feature from a given cluster if the recognizer's feature appears to be an outlier. This could apply in the case of noise-suppression damage as described above.

In another example, phoneme and diphone likelihoods, which can be generated by "Sub-word Likelihood" stages 212a-m can be compared. As an example, the stage can include a Deep Neural Network (DNN) and/or a set of Hidden Markov Model (HMM) phoneme/diphone models. In some instances, likelihoods can be revised by a joint likelihood. If this is done, and all recognizers now use the same phoneme/diphone likelihoods, it may be sufficient then to run only one chain of word or sentence models if the recognizers are of the same design. However, if they are of different design it can still be worth running all with the same likelihoods. Likelihoods can be revised by throwing out diphones/phonemes that do not show up consistently across all recognizers. This keeps some difference/diversity in the resulting individual likelihoods used across recognizers, allowing multiple word and sentence models to follow with some independence in result(s). In yet another example, "Word-likelihoods" can be compared in a similar fashion to that described above for sub-words, with outliers removed and likelihoods revised, before going to the next stage.

E. Selector

As noted above, adding diversity to a recognition engine with multiple recognizers can help to correct errors and identify cases where likelihood differences could or should be reconsidered. However, in many instances, a given system 20 should provide one output of recognized speech. As shown in FIGS. 2-7, disclosed recognition systems 20 can include a selector 400 configured to determine a most-likely accurate transcription from among several transcription candidates 120a'-120m' generated by the recognition engine 200.

For example, a recognition bank can lack intermediate comparisons of results, and a selector 400 can consider an ordered list of transcription candidates from each recognizer 210a-m. Besides its relative simplicity, such an approach can require little to no significant change to a recognition engine or constituent recognizers.

Such a selector can require little or no change to existing designs of recognizers 210a-m and can be suitable applications in which a recognizer often provides a relatively accurate transcription of a given utterance, or where transcription errors are relatively small or can be attributed to small likelihood differences between competing transcription candidates. Accordingly, in some embodiments, existing recognizer designs can be collected together to form a bank of recognizers 210a-m.

As described above, each recognizer in a bank of recognizers 210a-m can produce an ordered list of most likely transcription candidates (e.g., word, phrase, sentence, depending on what is being recognized), along with a likelihood measure for each such transcription. The selector 400 can assess (e.g., compare) likelihoods across the recognizers and make a joint decision or selection of a highest overall transcription candidate 140.

Many different approaches for reaching such a joint decision are available, and several particular examples are now described by way of illustration. A transcription candidate 120a'-120m' with a largest likelihood among all recognizers can be selected. Alternatively, the transcription with the largest net likelihood across all recognizers can be selected. If likelihoods are expressed in the log-likelihood domain then a net likelihood can be simply a sum of log-likelihoods for a given transcription candidate. Or, a transcription appearing in the largest number of $1^{st}$ place ranks of transcription candidates among the recognizers can be selected. Such an approach allows a $1^{st}$ place-outlier that may only show up on one recognizer to be discounted.

A transcription that appears most often in the ordered rankings of transcription candidates generated by the several recognizers can be selected. This option can be of particular interest compared to conventional speech recognition systems since the best overall transcription can show a high likelihood of being accurate but does not show up in first place consistently.

A transcription candidate can be selected that has the same or a substantially similar meaning as most transcription candidates based on considerations of the meanings of the top ordered rankings of transcription candidates generated by the several recognizers. In this example, transcription candidates need not match word-for-word, but can be considered as matching if each gives rise to a common interpretation in a given context.

Such a context can be in connection with controlling a device with a limited or finite control vocabulary. For example, transcriptions such "Turn on", "On", "Turn X On", "Turn it on," "Please turn on" can all generate an equivalent response and so can be considered the same.

Any of the foregoing examples for selecting a "best" transcription candidate from among several can further include discounting transcription candidates having a likelihood below a given likelihood threshold. Other transcriptions (or all output from a given recognizer) can be discounted where a significant number of similar likelihoods appear for transcription candidates having very different meanings or words. Such an occurrence can indicate substantial "noise" or "uncertainty" in the recognition results. One such measure of "uncertainty" is "entropy" defined probability weighted sum of log-probabilities or log-likelihoods. Likelihoods can easily be transformed to "entropy". Relatively higher-entropy can be indicative of relatively higher uncertainty, e.g., with respect to a given transcription candidate.

III. Distributed Speech Recognition System with Likelihood Fusion

Figure 8:
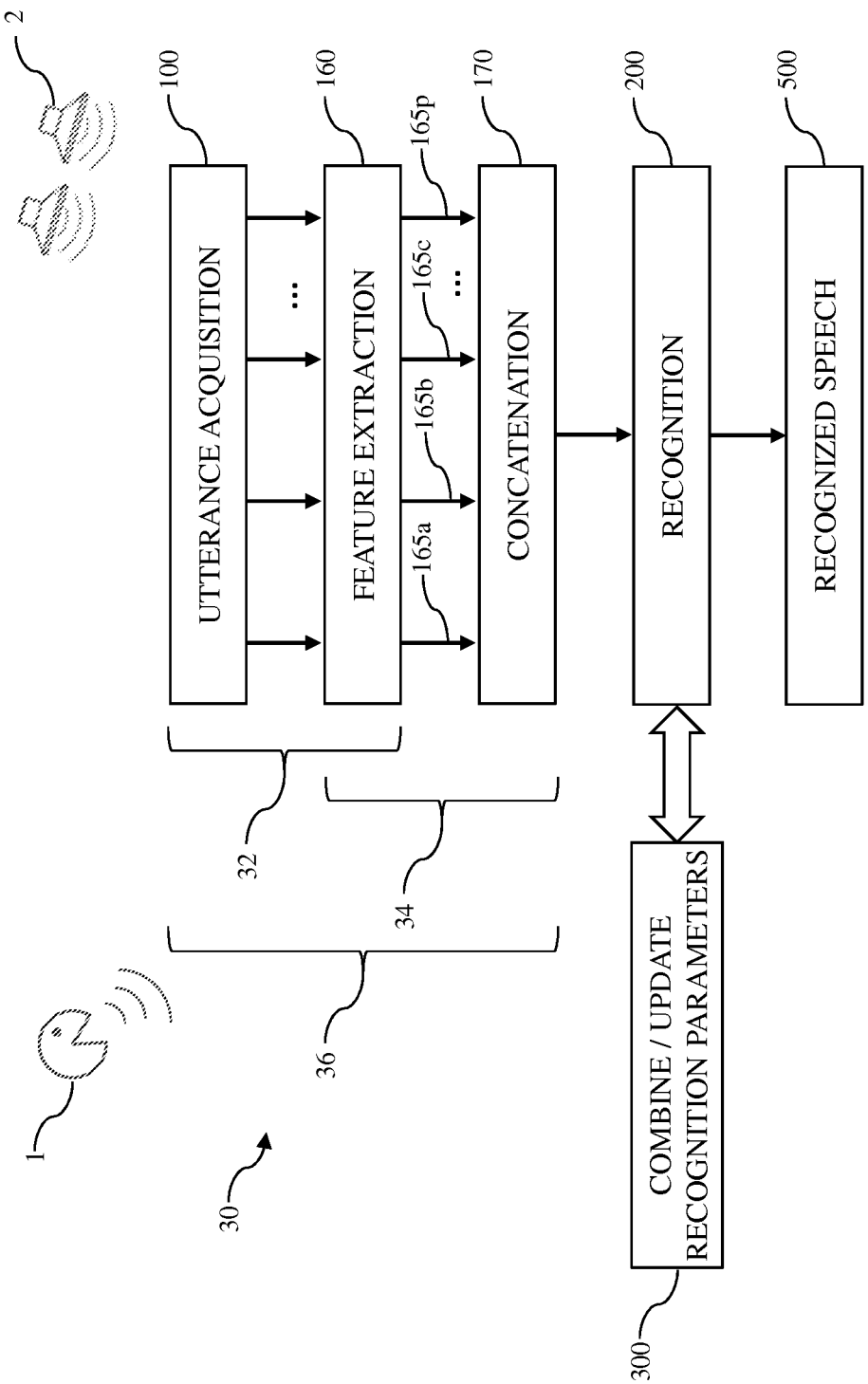
FIG. 8 shows a block diagram of an embodiment of the speech recognition system illustrated in FIG. 1.
Figure 9:
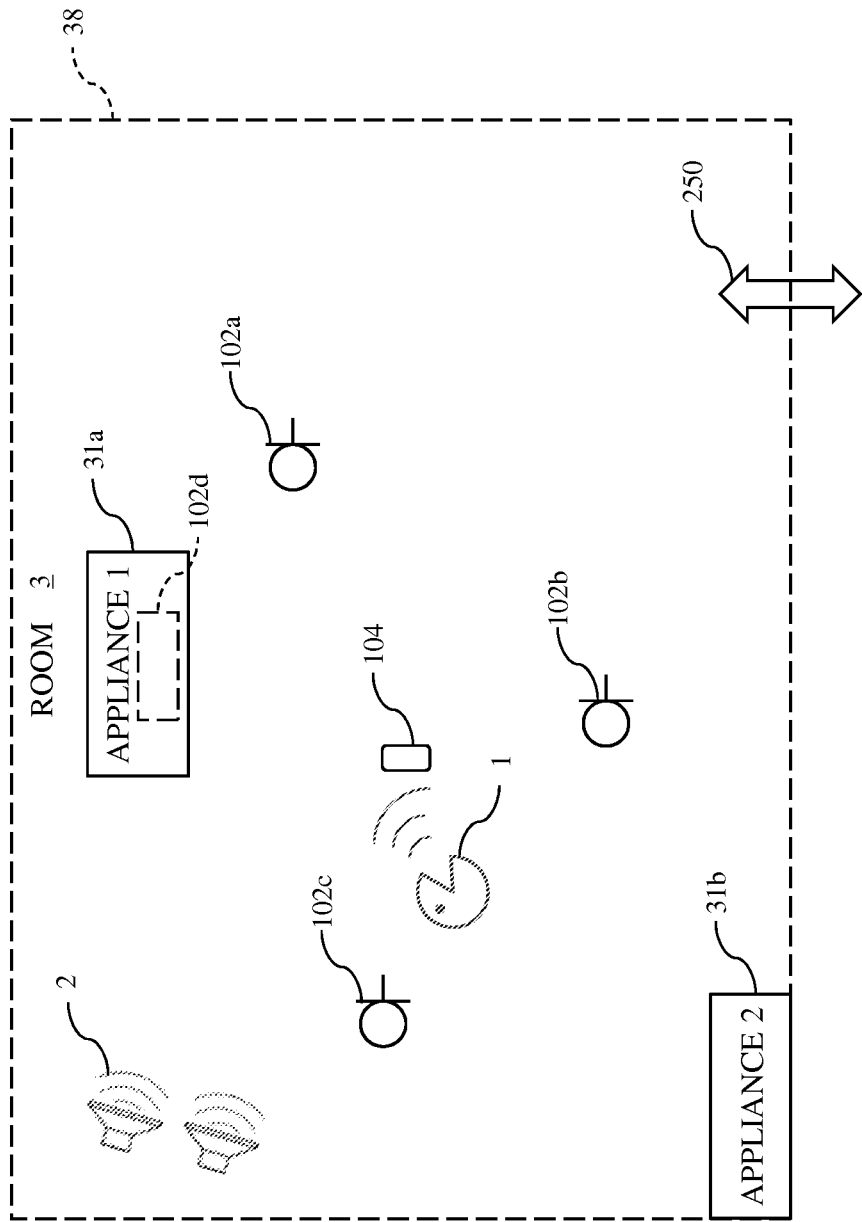
FIG. 9 schematically illustrates the embodiment of the speech recognition system shown in FIG. 8 installed and being used in a room.
Figure 10:
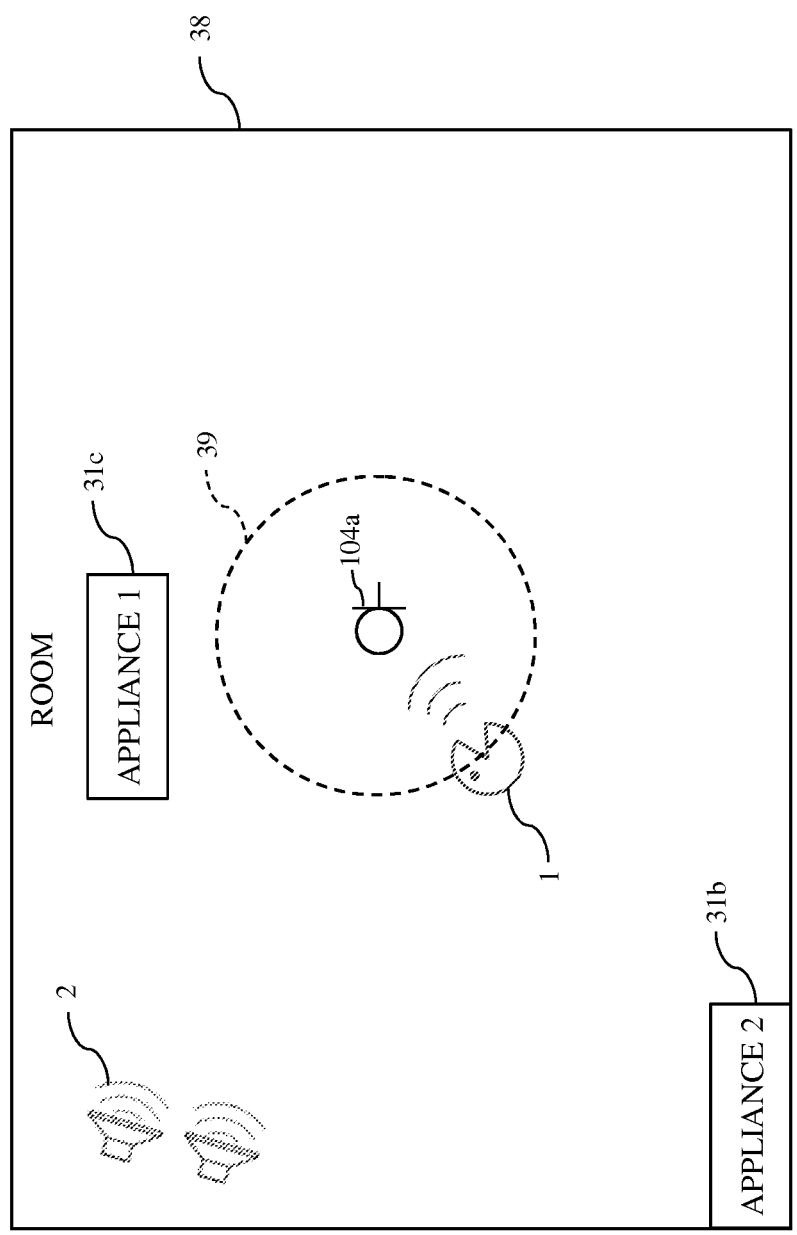
FIG. 10 shows a schematic illustration of a prior art speech recognition system installed in the room shown in FIG. 9.

Another speech recognition system 30 useful for resolving far-field utterances is described in relation to FIGS. 8-16. More particularly, systems 30 can provide effective far-field communication with home automation devices without encumbering or constraining a user's movement throughout a room environment. Contrary to conventional systems, disclosed systems 30 do not require a user to stand near a single receiver 104a (FIG. 10) and speak towards that receiver. Rather, as shown in FIG. 9, a user can naturally move throughout a given environment (e.g., a room 3), and not be constrained to the limited range 39 of a conventional system. Instead, disclosed systems operate effectively throughout the room (indicated by dashed line 38 being coextensive with the boundary of the room 3).

Speech recognition systems 30 can include several far-field receivers 102a-d distributed spatially throughout a room and are based on innovative front-end signal processing and speech recognition architectures that combines inputs from the distributed receivers. (Although four far-field receivers 102a-d are illustrated, disclosed systems can have more or fewer than four distributed far-field receivers. In addition, one or more near-field receivers 104 (e.g., a user's cell phone, a nearby tablet computing device, etc.) can be used to achieve improved word-error-rates in connection with output transcriptions, largely without regard to a user's particular position or direction of speech 1 within the room 3.

As noted above, speech recognition systems 30 (shown in and described in relation to FIGS. 8-16) can concurrently extract likely acoustic features (e.g., triphones and corresponding posterior probabilities) from each of several versions of an utterance. The likely acoustic features can be fused together (e.g., based on posterior probabilities associated with the acoustic features) to generate a stream of most-likely acoustic features representative of a given utterance 1. Such systems 30 can then apply one or more recognition parameters to the stream of most-likely acoustic features to derive a highest-likelihood transcription of the utterance 1.

In a general sense, such speech recognition systems can resolve near- and/or far-field utterances.

A. Utterance Acquisition

Figure 11:
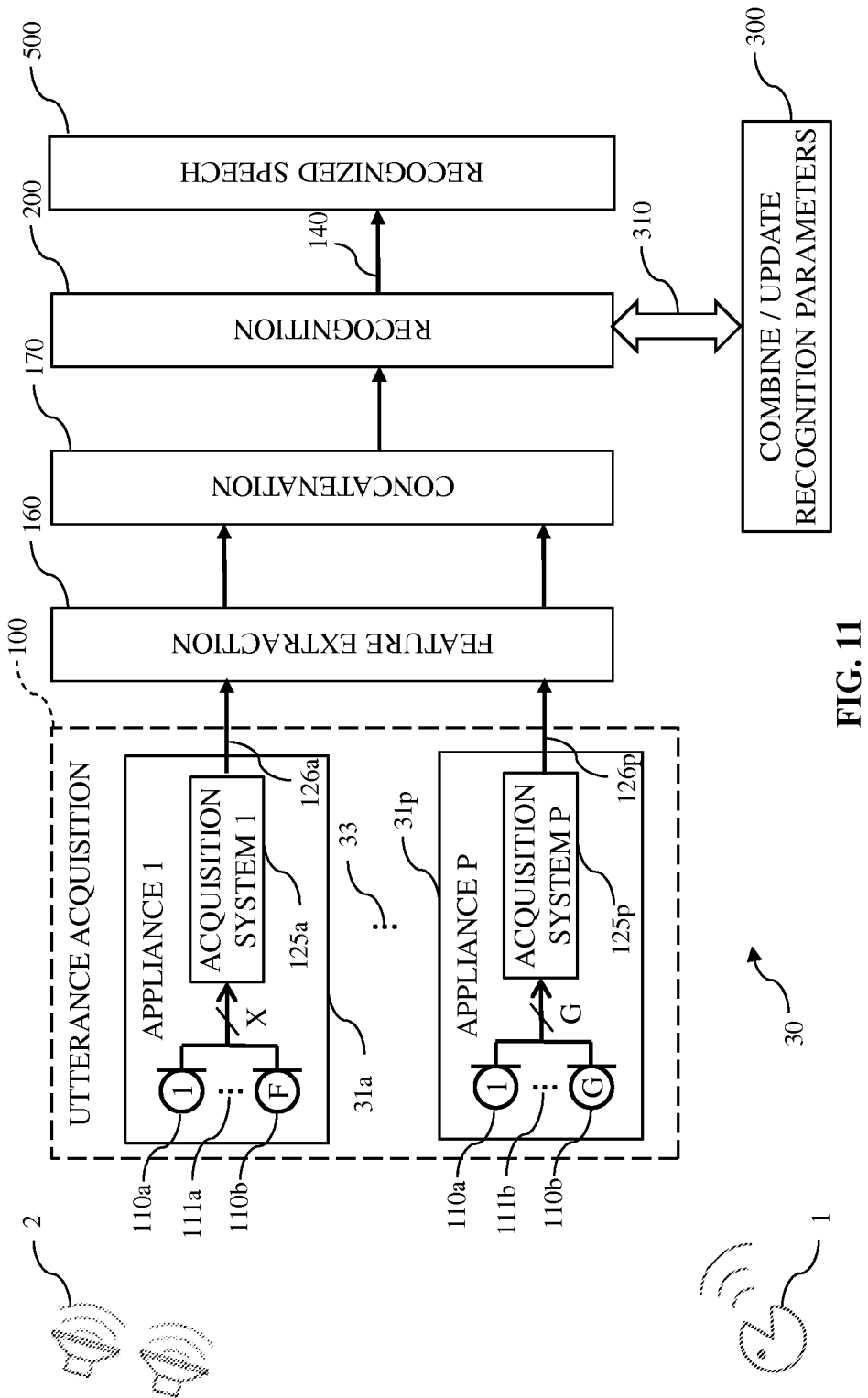
FIG. 11 shows a block diagram of an embodiment of the speech recognition system illustrated in FIG. 8. More particularly, but not exclusively, aspects of distributed utterance acquisition are shown.

As shown in FIG. 11, disclosed speech recognition systems 30 can have several P spatially distributed devices, or receivers, 31a-p. (The ellipsis 33 indicates that appliances 31b through 31(p-1) exist but are not illustrated in the distributed arrangement 100 of receivers.) Each respective device 31a-p can have a corresponding one or more microphones, indicated by different integer values F and G. The ellipsis 111a indicates the appliance 31a has microphones 110b-110(f-1). No two devices need have a common number of microphones to be compatible with systems 30, though two (or all) devices can have an identical or corresponding number of microphones.

An utterance acquisition appliance 31a-p can include a respective acquisition processor 125a-p. Such an acquisition processor can apply any one or more front-end processing techniques to an acoustic output signal received from the corresponding group of microphones 110a-f, 110a-g. Front-end processing with multi-microphone techniques, and specially trained far-field acoustic models, has been shown to reduce WER at moderate distances from about 60% to about 10 to 15%, although such exemplary results are likely optimistic because they were obtained under clean acoustic conditions and do not account for standard noises inside a home (e.g., a running dishwasher, an operating TV, or vacuum, etc.).

Incoming signal characteristics from the microphones can be manipulated by the acquisitions processors 125a-p (e.g., by applying one or more signal processing techniques to microphone signal). Accordingly, the number of versions of a given utterance produced by each of the several distributed acquisition processors 125a-p can differ from a number of microphones F, G in a given appliance 31a-p.

Thus, each acquisition processor 125a-p can produce one or more streams of acquired audio 126a-p. Each stream of acquired audio 126a-p can, in turn, include one or more representations of a given utterance produced by each acquisition processor. For example, an acquisition processor 125a-p can receive signals from several microphones, and the acquisition processor can process the signals, for example, using beamforming techniques to generate several audio streams across different look directions. Accordingly, a given output stream from a particular acquisition processor can produce several audio streams representing different versions of a given utterance.

A typical far field receiver can have between about 4 and about 12 microphones (though other numbers of microphones are contemplated). A typical near-field receiver 104 can have one or two microphones, though additional microphones are contemplated. Desirably, a given distributed speech recognition system 30 has at least three far-field receivers (e.g., for minimal planar coverage) and any number, e.g., 0, 1, 2, etc., near-field receivers. Word recognition performance only improves if additional receivers are incorporated.

B. Feature Extraction

Figure 12:
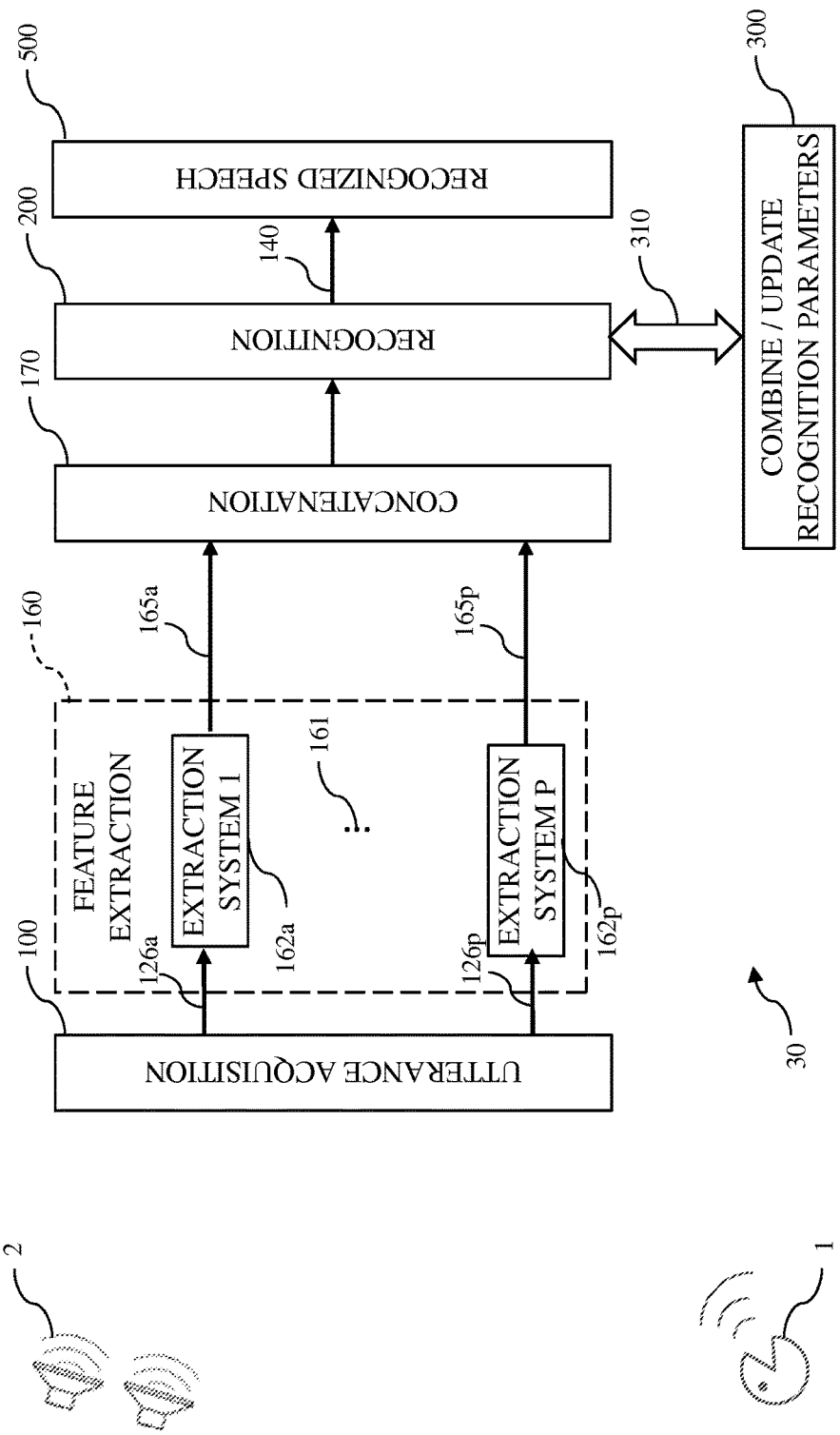
FIG. 12 shows a block diagram of an embodiment of the speech recognition system illustrated in FIG. 8. More particularly, but not exclusively, aspects of an acoustic-feature extractor are shown.
Figure 13:
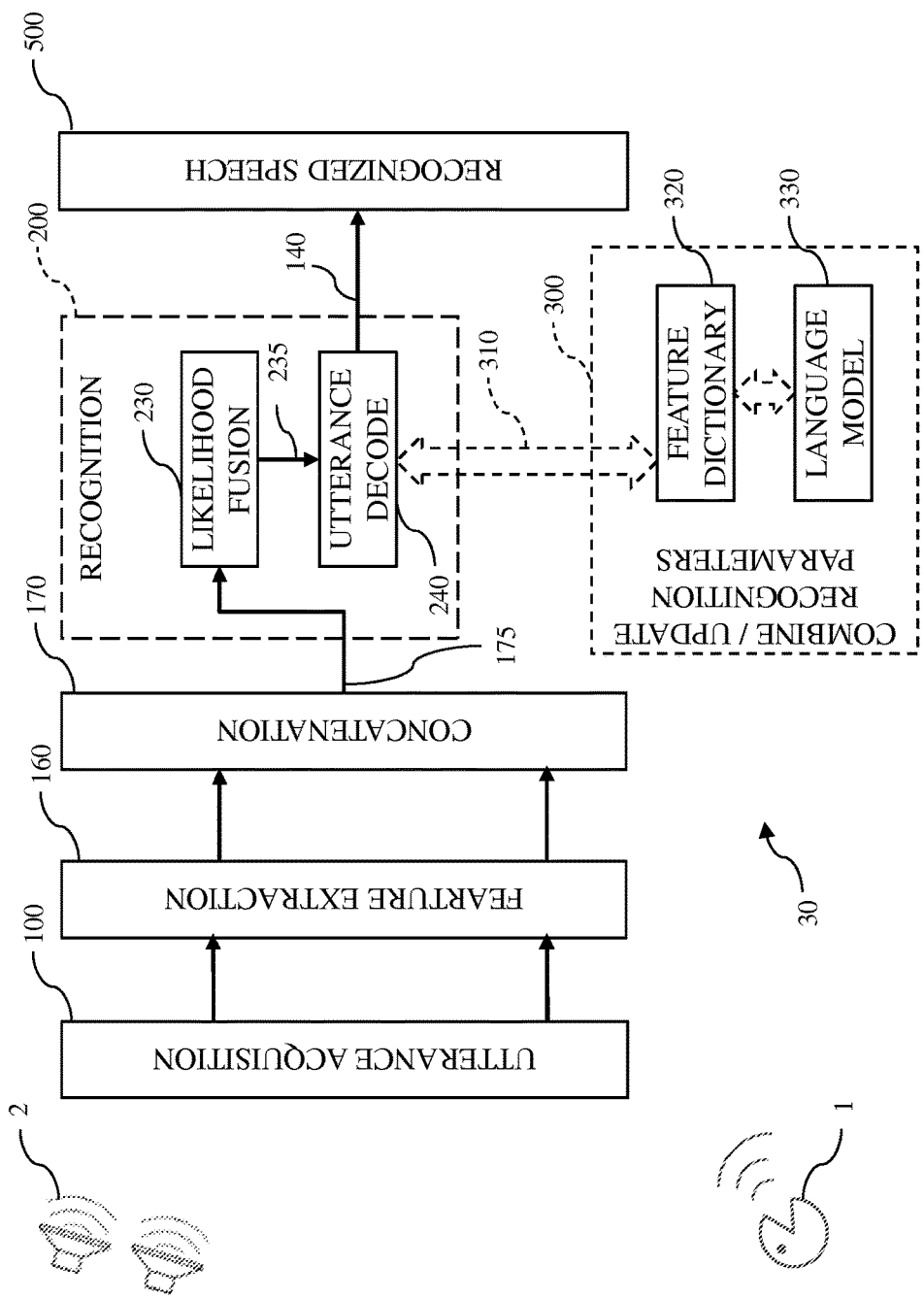
FIG. 13 shows a block diagram of an embodiment of the speech recognition system illustrated in FIG. 8. More particularly, but not exclusively, aspects of a recognition engine and an updater are shown.

In turn, the acoustic-feature extraction engine 160 can receive the several independent streams of acquired audio 126a-p from the several acquisition processors. As shown in FIG. 12, the extraction engine 160 can include several constituent extraction processors 162a-p, and each extraction processor can receive one or more streams of audio from an acquisition processor 125a-p.

Extraction processors 162a-p can be configured to extract acoustic features from streams of far-field or near-field speech. For example, some extraction processors can apply a selected far-field or a selected near-field processing technique to a stream. Other extraction processors can apply only a far-field or only a near-field technique to an incoming stream.

Figure 14:
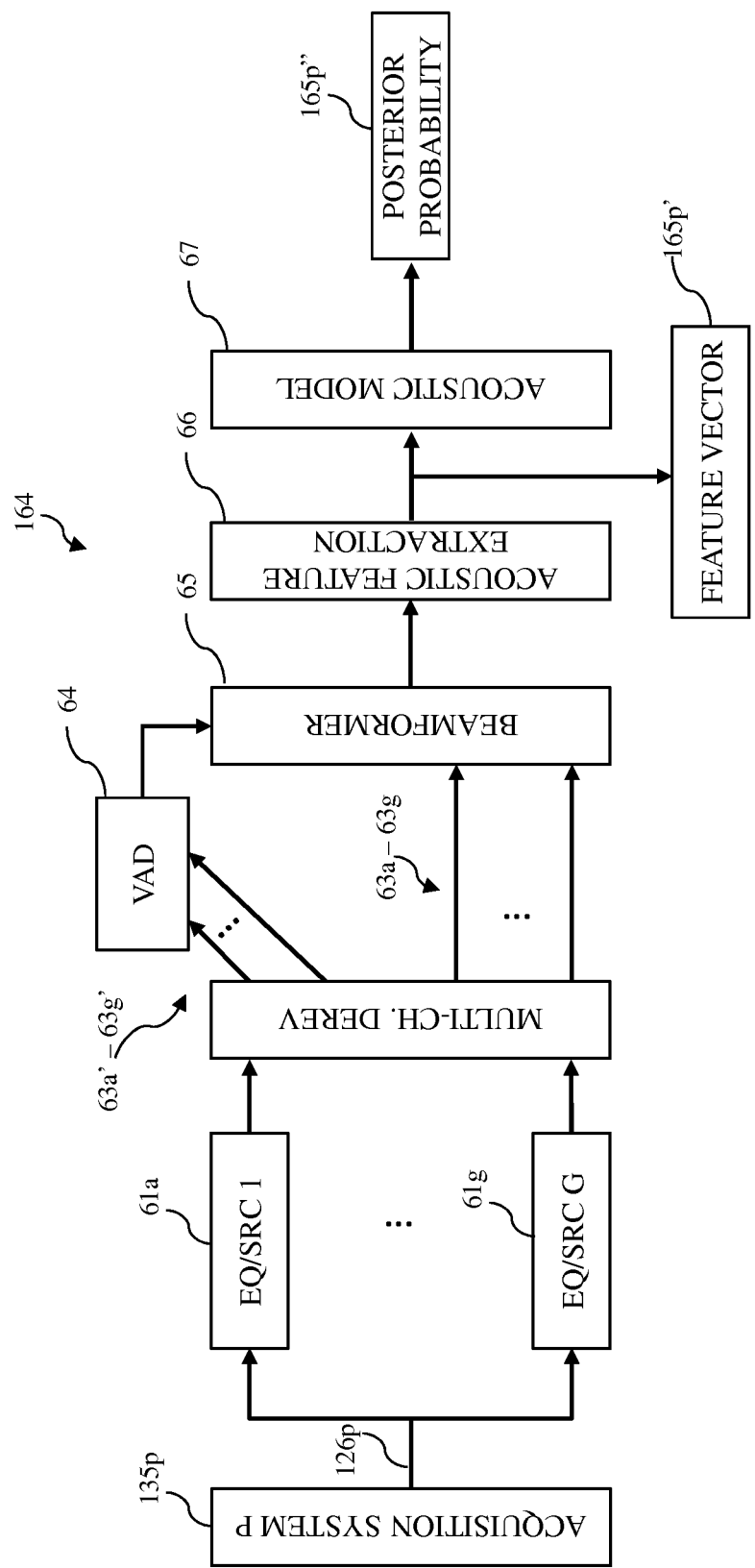
FIG. 14 schematically illustrates aspects of an embodiment of a far-field acoustic-feature extractor, as in FIG. 12, are shown.

An example of a far-field processor is illustrated in FIG. 14. In FIG. 14, one or more incoming audio streams 126p can be received from an acquisition processor 135p. An equalizer 61a-g can equalize each incoming stream, e.g., to provide a uniform frequency response, as between about 150 Hz and about 8,000 Hz, for example. As well, a sampling-rate-converter (SRC) can up- or down-sample each stream (e.g., to about a 16,000 Hz output from each microphone channel), as for computational efficiency. A multi-channel de-reverberation processor 62 can be applied to each stream, and the output streams 63a-g from the derverberator can be sent to a multi-channel beam former. A voice-activity-detector (VAD) can aid in estimating noise statistics when a user is not talking.

An extraction processor 66 can extract any of a variety of selected acoustic features (e.g., triphones and associated posterior probabilities). In one example, such extraction can use a deep neural network (DNN) specially trained on far-field data under various realistic and synthetic noise or other impairment conditions. Far-field DNN can use an initial autoencoder front-end, specially trained on additional noiseless data examples to maximize generalization to unseen noise conditions.

A deep neural network (DNN) can be an artificial neural network with multiple hidden layers of units between the input and output layers DNNs can model complex non-linear relationships. The extra layers enable composition of features from lower layers, giving the potential of modeling complex data with fewer units than a similarly performing shallow network.

In some instances, DNNs can evaluate the likelihood of a particular sequence using a feed-forward neural network that takes several frames of features as input and produces posterior probabilities over Hidden Markov model (HMM) states as output. DNNs can efficiently model data that lie on or near a nonlinear manifold in the data space. Thus, DNNs with many hidden layers have been shown to outperform GMMs on a variety of speech recognition benchmarks, sometimes by a large margin. A particular example of a DNN architecture has 3 hidden layers with 1024 neurons in each layer and 11 frame inputs (e.g., 5 past frames and 5 future frames).

Figure 15:
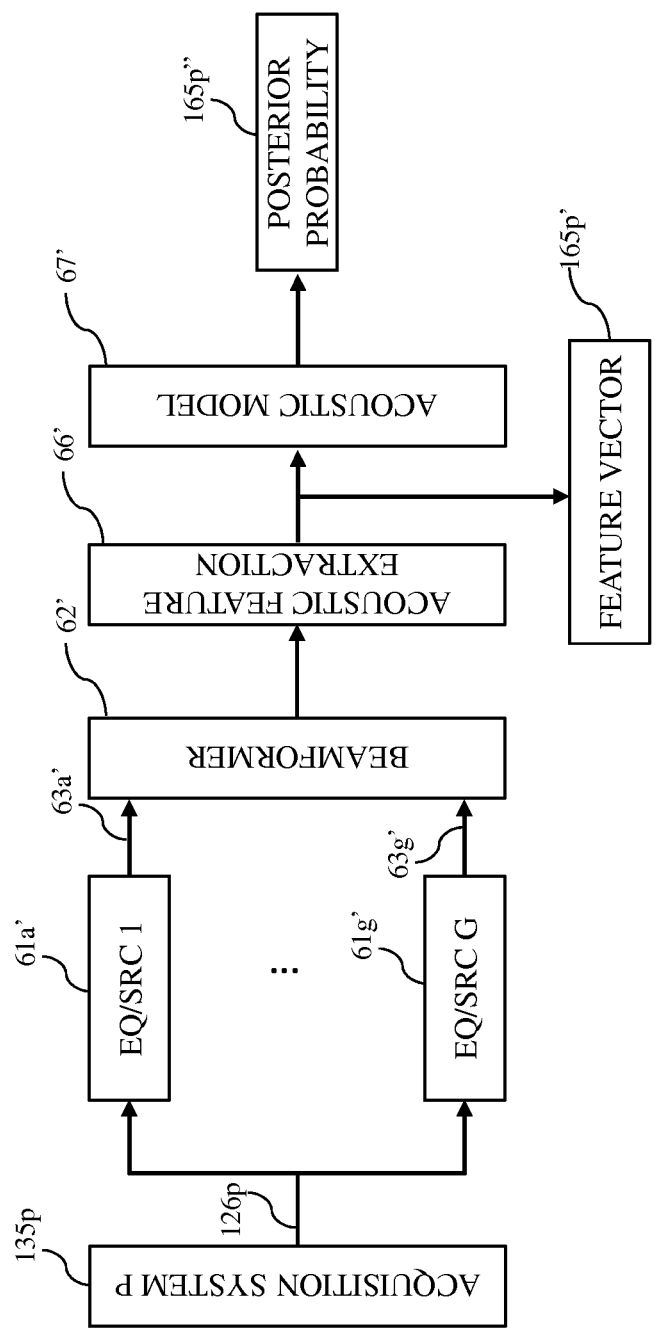
FIG. 15 schematically illustrates aspects of an embodiment of a near-field acoustic-feature extractor, as in FIG. 12, are shown.
Figure 16:
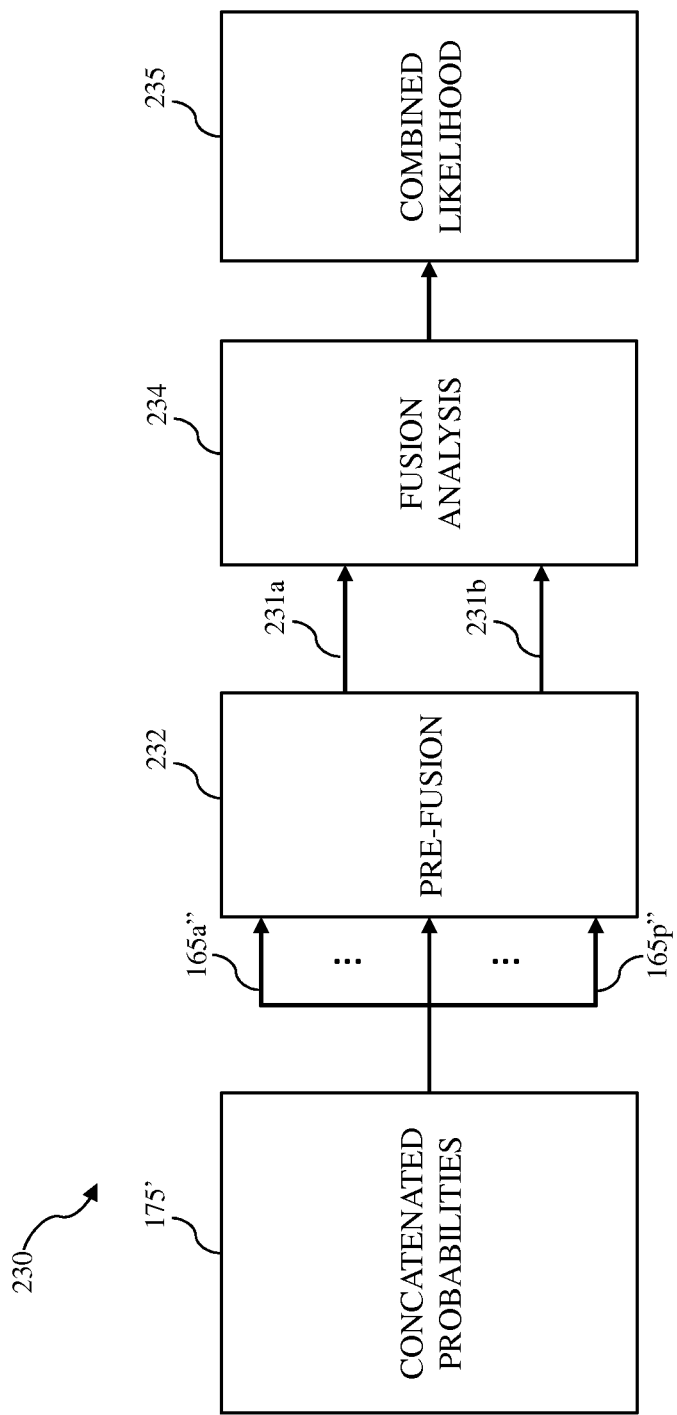
FIG. 16 schematically illustrates aspects of an embodiment of a fusion process suitable for use in a recognition engine of the type shown in FIG. 13.

A near-field processor is shown in FIG. 15 and can be configured similarly to the far-field processor shown in FIG. 14. Features shown in FIG. 15 that are similar to the features shown in FIG. 14 are represented by a common reference numeral with a superscript "prime" (i.e., ') to denote their similar nature. The processor shown in FIG. 15 uses standard DNN acoustic models, omits multichannel dereverberation, and uses, for example, one microphone or a fixed beamformer associated with two closely-spaced microphones directed perpendicularly away from a screen of the mobile device 104 (e.g., FIG. 9). When using just one microphone, the fixed beamformer block can be eliminated from the processor.

Each extraction processor 162a-p can extract one or more acoustic features from incoming streams 126a-p. Representative output from the extraction processors include Mel-scale filterbank magnitudes (FBANK) and low-order Mel-frequency cepstral coefficients (MFCC), as well as output posterior probabilities over triphone states, representing a beginning, middle, and end of each phoneme. The acoustic feature factor for an $n^{th}$ far-field receiver at frame t is denoted $y_{n,t}$. The corresponding acoustic feature vector for an $m^{th}$ near-field receiver is denoted $z_{m,t}$, and the triphone state is denoted $s_t$.

Acoustic features and triphone likelihoods ($p(y_{n,t}|s_t)$ or $p(z_{m,t}|s_t)$) can be computed locally at each extraction processor. Streams 165a-p of the acoustic features can be transmitted to a hub 170 over any suitable communication connection (e.g., a wireless channel).

C. Concatentation

Each of the extraction processors 162a-p can maintain or establish a communication connection to a central processing "hub" 170. The hub can assemble, concatenate, or otherwise aggregate the several streams 165a-p of acoustic features into a stream 175. The hub 170 can maintain or establish a communication connection with a recognition engine 200, which can exist on an external or remote server, or can be included in one or more of the distributed appliances 31a-p. The stream 175 of aggregated acoustic features can be communicated to the recognition engine.

D. Recognition Engine

The recognition engine 200 can decode the stream of acoustic features using a fusion approach. In traditional ASR, triphone posteriors are converted to likelihoods and decoded into words by a hidden Markov model (HMM) (REF), informed by a phonetic dictionary (PD) and a language model (LM).

In contrast, the recognition engine 230 (FIG. 16) fuses the triphone posteriors using a secondary ("fusion") deep neural network (FDNN) informed by 1) a naive Bayes combination (product-likelihood) of all channel likelihoods and 2) a Dempster-Shafer belief fusion.

The naive Bayes combination considers that triphone posteriors will be sharply concentrated about correct phonemes where a signal-to-noise ratio (SNR) is high (e.g., where the user is close to a particular receiver, or where all noise sources are far from that receiver), and flat and/or concentrated about non-speech states where the SNR is low.

Implicitly, a product likelihood will be concentrated about triphones that would be selected by the highest SNR states. Hence, information from high-SNR receivers will be weighted most strongly and information from low-SNR receivers will be discounted or ignored. The inventors discovered that a naïve Bayes combination of triphone posteriors naturally adapts to a user's movements throughout a room 3, and does not rely on complicated decision heuristics. This discovery explains the expanded movement regions and talk directions available to users of disclosed systems 30 and represented in FIG. 9.

Naive Bayes can perform optimally when impairment signals on each receiver are statistically independent of each other. Dempster-Shafer fusion is based on similar ideas but performance is shown to be better when impairment signals are highly correlated, as might be expected for receivers physically close to each other. The FDNN processor 234 can weight either naive Bayes ($F_B(y_t,z_t|s_t)$) results 231a or Dempster-Shafer ($F_{DS}(y_t,z_t|s_t)$) results 231b adaptively based on characteristics learned from training on a large number of acoustic spaces to yield an output 235 of highest-likelihood utterance representations ($F(y_t,z_t|s_t)$) from the FDNN processor 234.

E. Recognition Parameter Store

Referring again to FIG. 13, an utterance decoder 240 in the recognition engine 200 can combine the output stream 235 of highest-likelihood utterance representations with one or more recognition parameters from a recognition parameter store 300. A given recognition parameter store can include an acoustic feature dictionary 320, a language model 330, or both. The utterance representations 235 can include several phonemes and the acoustic-feature dictionary can be a phonetic dictionary.

F. Alternative Appliance Configurations

As presented above, systems 30 have several distributed receivers, each having one or more microphones. In FIG. 11, the microphones 110a-f, 110a-g and the corresponding acquisition systems 125, 135 are associated with respective appliances 31a, 31p. However, a given appliance can incorporate selected ones of the functional blocks of systems 30 shown in FIG. 8.

For example, referring still to FIG. 8, a given appliance 32 can combine an utterance acquirer 100 and a feature extractor 160, a given appliance 34 can combine a feature extractor 160 and a "hub" 170, and an appliance 36 can incorporate an utterance acquirer 100, a feature extractor 160 and a "hub" 170. Although not expressly shown in FIG. 8, a speech recognition system 30 can include one appliance that includes functional blocks 100, 160, 170, together with a recognition engine 200 and even a recognition parameter store 300.

IV. Computing Environments

Figure 17:
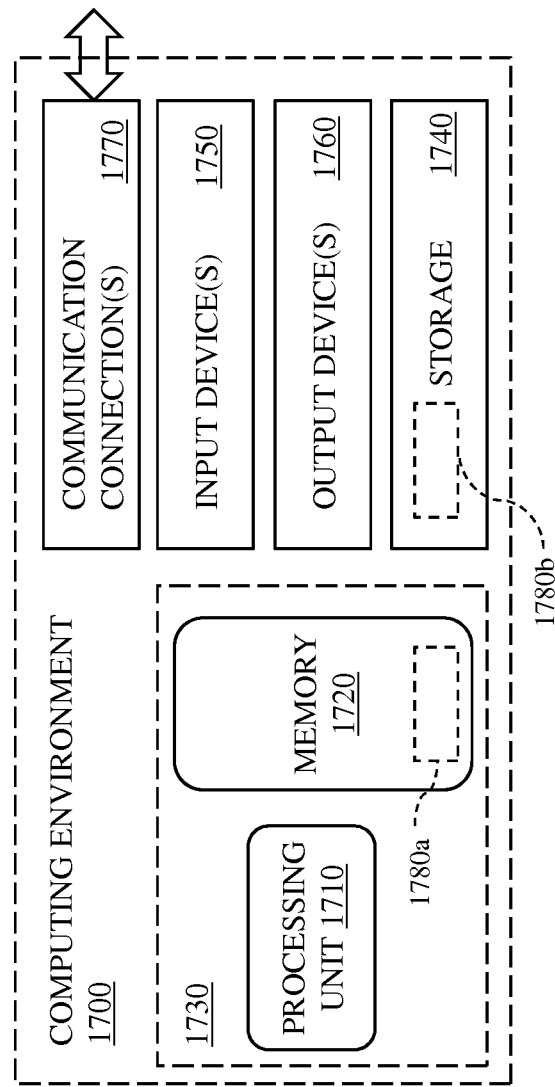
FIG. 17 shows a schematic illustration of a computing environment suitable for implementing one or more technologies disclosed herein.

FIG. 17 illustrates a generalized example of a suitable computing environment 1700 in which described methods, embodiments, techniques, and technologies relating, for example, to speech recognition can be implemented. The computing environment 1700 is not intended to suggest any limitation as to scope of use or functionality of the technologies disclosed herein, as each technology may be implemented in diverse general-purpose or special-purpose computing environments. For example, each disclosed technology may be implemented with other computer system configurations, including hand held devices (e.g., a mobile-communications device, or, more particularly, IPHONE®/IPAD® devices, available from Apple, Inc. of Cupertino, Calif.), multiprocessor systems, microprocessor-based or programmable consumer electronics, network PCs, minicomputers, mainframe computers, smartphones, tablet computers, and the like. Each disclosed technology may also be practiced in distributed computing environments where tasks are performed by remote processing devices that are linked through a communications connection or network. In a distributed computing environment, program modules may be located in both local and remote memory storage devices.

The computing environment 1700 includes at least one central processing unit 1710 and memory 1720. In FIG. 17, this most basic configuration 1730 is included within a dashed line. The central processing unit 1710 executes computer-executable instructions and may be a real or a virtual processor. In a multi-processing system, multiple processing units execute computer-executable instructions to increase processing power and as such, multiple processors can be running simultaneously. The memory 1720 may be volatile memory (e.g., registers, cache, RAM), non-volatile memory (e.g., ROM, EEPROM, flash memory, etc.), or some combination of the two. The memory 1720 stores software 1780a that can, for example, implement one or more of the innovative technologies described herein.

A computing environment may have additional features. For example, the computing environment 1700 includes storage 1740, one or more input devices 1750, one or more output devices 1760, and one or more communication connections 1770. An interconnection mechanism (not shown) such as a bus, a controller, or a network, interconnects the components of the computing environment 1700. Typically, operating system software (not shown) provides an operating environment for other software executing in the computing environment 1700, and coordinates activities of the components of the computing environment 1700.

The store 1740 may be removable or non-removable, and can include selected forms of machine-readable media. In general machine-readable media includes magnetic disks, magnetic tapes or cassettes, CD-ROMs, CD-RWs, DVDs, magnetic tape, optical data storage devices, and carrier waves, or any other machine-readable medium which can be used to store information and which can be accessed within the computing environment 1700. The storage 1740 stores instructions for the software 1780, which can implement technologies described herein.

The store 1740 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hard-wired circuit components.

The input device(s) 1750 may be a touch input device, such as a keyboard, keypad, mouse, pen, touchscreen or trackball, a voice input device, a scanning device, or another device, that provides input to the computing environment 1700. For audio, the input device(s) 1750 may include a microphone or other transducer (e.g., a sound card or similar device that accepts audio input in analog or digital form), or a CD-ROM reader that provides audio samples to the computing environment 1700. The output device(s) 1760 may be a display, printer, speaker, CD-writer, or another device that provides output from the computing environment 1700.

The communication connection(s) 1770 enable communication over a communication medium (e.g., a connecting network) to another computing entity. The communication medium conveys information such as computer-executable instructions, compressed graphics information, or other data in a modulated data signal.

Tangible machine-readable media are any available, tangible media that can be accessed within a computing environment 1700. By way of example, and not limitation, with the computing environment 1700, computer-readable media include memory 1720, storage 1740, communication media (not shown), and combinations of any of the above. Tangible computer-readable media exclude transitory signals.

V. Other Embodiments

The examples described above generally concern speech recognition techniques and related systems. Other embodiments than those described above in detail are contemplated based on the principles disclosed herein, together with any attendant changes in configurations of the respective apparatus described herein. Incorporating the principles disclosed herein, it is possible to provide a wide variety of systems adapted to enhance speech contained in an impaired speech signal, for example, in "hands-free" communication systems, in aviation communication systems, in conference room speaker phones, in auditorium sound systems, etc.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by references in its entirety for all purposes.

The principles described above in connection with any particular example can be combined with the principles described in connection with another example described herein. Accordingly, this detailed description shall not be construed in a limiting sense, and following a review of this disclosure, those of ordinary skill in the art will appreciate the wide variety of filtering and computational techniques that can be devised using the various concepts described herein. Moreover, those of ordinary skill in the art will appreciate that the exemplary embodiments disclosed herein can be adapted to various configurations and/or uses without departing from the disclosed principles.

The previous description of the disclosed embodiments is provided to enable any person skilled in the art to make or use the disclosed innovations. Various modifications to those embodiments will be readily apparent to those skilled in the art, and the generic principles defined herein may be applied to other embodiments without departing from the spirit or scope of this disclosure. Thus, the claimed inventions are not intended to be limited to the embodiments shown herein, but are to be accorded the full scope consistent with the language of the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the features described and claimed herein. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

Thus, in view of the many possible embodiments to which the disclosed principles can be applied, we reserve to the right to claim any and all combinations of features and technologies described herein as understood by a person of ordinary skill in the art, including, for example, all that comes within the scope and spirit of the following claims.

We currently claim:

1. A speech recognition system for resolving far-field utterances, comprising:
   an acoustic appliance comprising a processor, a memory and a communication connection to communicate with one or more spatially distributed acoustic appliances, wherein the memory stores instructions which, when executed by the processor, cause the system to
   concurrently receive over the communication connection a plurality of representations of an utterance observed by the one or more spatially distributed acoustic appliances;
   determine a highest-probability representation of the utterance based on the plurality of utterance representations; and
   determine a most-likely transcription corresponding to the highest-probability representation of the utterance.

2. The speech recognition system according to claim 1, wherein the plurality of representations of the utterance comprises a concatenation of utterance representations and corresponding posterior probabilities.

3. The speech recognition system according to claim 1, wherein each of the utterance representations has an associated posterior probability, and wherein the highest-probability representation of the utterance is further based in part on a combination of the plurality of posterior probabilities corresponding to the utterance representations.

4. The speech recognition system according to claim 1, wherein utterance representations having relatively higher signal-to-noise ratio as compared to utterance representations having relatively lower signal-to-noise ratio are more heavily weighted to determine the highest-probability representation of the utterance.

5. The speech recognition system according to claim 1, wherein the memory further contains a recognition parameter store, wherein the instructions, when executed by the processor, further cause the system to combine one or more recognition parameters from the recognition parameter store with the highest-probability representations of the utterance.

6. The speech recognition system according to claim 5, wherein the plurality of representations of the utterance comprises a plurality of acoustic features, each having a corresponding posterior probability, and wherein the instructions, when executed by the processor, further cause the system to identify the acoustic features having a highest-probability of correctly representing the utterance, and to combine the one or more recognition parameters from the recognition parameter store with the highest probability acoustic features.

7. The speech recognition system of claim 6, wherein the recognition parameter store comprises an acoustic feature dictionary, a language model, or both.

8. The speech recognition system of claim 7, wherein the plurality of utterance representations comprises a plurality of phonemes and the acoustic feature dictionary comprises a phonetic dictionary.

9. The speech recognition system according to claim 1, wherein each representation of the utterance comprises one or more respective acoustic features and corresponding posterior probabilities, and wherein the instructions, when executed by the processor, further cause the system to aggregate the plurality of streams and corresponding posterior probabilities; and to select from the aggregated plurality of streams those acoustic features most likely to accurately reflect the utterance.

10. The speech recognition system according to claim 9, wherein the acoustic appliance comprises a first acoustic appliance, the system further comprising a second acoustic appliance to extract acoustic features from an acoustic signal received by the-second appliance and to stream the extracted acoustic features over the communication connection to the first acoustic appliance.

11. The speech recognition system according to claim 10, wherein the first appliance and/or the second appliance comprises a near-field acoustic-feature extractor, a far-field acoustic-feature extractor, or both.

12. The speech recognition system according to claim 10, wherein the first appliance is configured to synchronize the plurality of received streams of acoustic features and associated posterior probabilities.

13. A speech-recognition method, comprising:

over a communication connection, receiving from a plurality of spatially distributed audio appliances a corresponding plurality of representations of an utterance observed by the acoustic appliances, wherein each audio appliance has one or more microphone transducers and associated circuitry to convert observed audio to an acoustic signal representative of the audio;

selecting a highest-probability representation of the utterance based on the plurality of representations of the utterance;

determining a most-likely transcription of the utterance in correspondence to the highest-probability representation of the utterance; and responsive to the most-likely transcription of the utterance, invoking one or more instructions.

14. The speech recognition method according to claim 13, wherein each of the utterance representations has an associated posterior probability, and wherein the act of selecting the highest-probability representation comprises combining the plurality of posterior probabilities corresponding to the utterance representations.

15. The speech recognition method according to claim 14, wherein the act of selecting the highest-probability representation further comprises more heavily weighting utterance representations having relatively higher signal-to-noise ratio as compared to utterance representations having relatively lower signal-to-noise ratio.

16. The speech recognition method according to claim 13, further comprising combining one or more recognition parameters from a recognition parameter store with the highest-probability utterance representation.

17. A non-transitory, computer-readable media containing instructions that, when executed by a processor, cause a computing environment to perform a speech recognition method comprising:

over a communication connection, receiving from a plurality of spatially distributed audio appliances a corresponding plurality of representations of an utterance observed by the acoustic appliances, wherein each audio appliance has one or more microphone transducers and associated circuitry to convert observed audio to an acoustic signal representative of the audio;

selecting a highest-probability representation of the utterance based on the plurality of representations of the utterance;

determining a most-likely transcription of the utterance in correspondence to the highest-probability representation of the utterance; and responsive to the most-likely transcription of the utterance, invoking one or more instructions.

18. The non-transitory, computer-readable media according to claim 17, wherein each of the utterance representations has an associated posterior probability, and wherein the act of selecting the highest-probability representation comprises combining the plurality of posterior probabilities corresponding to the utterance representations.

19. The non-transitory, computer-readable media according to claim 18, wherein the act of selecting the highest-probability representation further comprises more heavily weighting utterance representations having relatively higher signal-to-noise ratio as compared to utterance representations having relatively lower signal-to-noise ratio.

* * * * *

UNITED STATES PATENT AND TRADEMARK OFFICE
CERTIFICATE OF CORRECTION

PATENT NO. : 9,865,265 B2
APPLICATION NO. : 14/732715
DATED : January 9, 2018
INVENTOR(S) : Sean A. Ramprashad et al.

It is certified that error appears in the above-identified patent and that said Letters Patent is hereby corrected as shown below:

In Claim 10 at Column 27, Line 13, the term "the-second" should read "the second".

Signed and Sealed this
Twentieth Day of March, 2018

Andrei Iancu
*Director of the United States Patent and Trademark Office*